United States Patent
Nakagawa

(10) Patent No.: US 10,649,723 B2
(45) Date of Patent: May 12, 2020

(54) COMMUNICATION DEVICE, CONTROL METHOD, AND STORAGE MEDIUM

(71) Applicant: CANON KABUSHIKI KAISHA, Tokyo (JP)

(72) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/520,097

(22) Filed: Jul. 23, 2019

(65) Prior Publication Data

US 2020/0042281 A1 Feb. 6, 2020

(30) Foreign Application Priority Data

Jul. 31, 2018 (JP) .................. 2018-143507

(51) Int. Cl.
*G06F 3/16* (2006.01)
*H04W 76/25* (2018.01)
*H04L 29/06* (2006.01)

(52) U.S. Cl.
CPC .......... *G06F 3/165* (2013.01); *H04L 65/4076* (2013.01); *H04L 65/4092* (2013.01); *H04W 76/25* (2018.02)

(58) Field of Classification Search
CPC ........... G06F 3/16; G06F 3/165; H04L 28/06; H04W 76/25
USPC ..................... 700/94; 381/80, 107
See application file for complete search history.

(56) References Cited

U.S. PATENT DOCUMENTS

| 2005/0049735 A1* | 3/2005 | Kim | G11B 27/034 700/94 |
| 2015/0347577 A1* | 12/2015 | Miyazaki | H04N 21/436 707/752 |
| 2018/0088894 A1* | 3/2018 | VanBlon | G06F 3/165 |

FOREIGN PATENT DOCUMENTS

JP 2014-219486 A 11/2014

* cited by examiner

*Primary Examiner* — Melur Ramakrishnaiah
(74) *Attorney, Agent, or Firm* — Canon U.S.A., Inc. IP Division

(57) ABSTRACT

In a case where a communication device receives a playback request for second content while playing back first content, the communication device starts playing back the second content, based on a fact that a communication device identified by identification information about a communication device that has transmitted a playback request for the first content is identical to a communication device identified by identification information about a communication device that has transmitted the playback request for the second content, and continues playing back the first content, based on a fact that the communication devices are different. The communication device starts playing back the second content, based on a fact that a user identified by user identification information about the first content is identical to a user identified by user identification information about the second content, and continues playing back the first content, based on a fact that the users are different.

27 Claims, 9 Drawing Sheets

COMMUNICATION DEVICE, CONTROL METHOD, AND STORAGE MEDIUM

BACKGROUND

Field of the Disclosure

The present disclosure relates to playback of content in a communication device.

Description of the Related Art

An existing communication device has a function of sharing, with another communication device, a screen that is displayed or audio that is being played back. As information of a screen that is displayed by another communication device or audio that is being played back by the other communication device, content including image data or audio data is transmitted to a communication device, and the communication device plays back the received content in synchronization with the other communication device. Accordingly, the communication device and the other communication device are able to share the screen that is displayed or the audio that is being played back. This is called a mirroring function.

In addition, an existing communication device is capable of receiving content including image data or audio data held by another communication device from the other communication device and playing back the content. This is called a direct streaming function.

In addition, an existing communication device is capable of receiving, on the basis of information received from another communication device, content including image data or audio data from an external device different from the other communication device, and playing back the content. This is called a content redirection function.

Japanese Patent Laid-Open No. 2014-219486 discloses a technique in which, when a communication device having a mirroring function and a content redirection function receives a playback request for second content while playing back first content, the communication device determines whether or not to play back the second content. The communication device disclosed in Japanese Patent Laid-Open No. 2014-219486 determines, in accordance with the type or projection method of the first content, whether or not to permit an interrupt.

The communication device disclosed in Japanese Patent Laid-Open No. 2014-219486 determines whether or not to play back the second content without considering whether or not the playback request for the second content is from the identical communication device or user. Thus, the communication device disclosed in Japanese Patent Laid-Open No. 2014-219486 may determine to play back the second content even if the source device or user that has transmitted the playback request for the first content is different from the source device or user that has transmitted the playback request for the second content. This is inconvenient for the user of the source device that has transmitted the playback request for the first content because playback of the first content is interrupted by playback of the second content. In addition, the communication device disclosed in Japanese Patent Laid-Open No. 2014-219486 may determine not to playback the second content even if the source device or user that has transmitted the playback request for the first content is identical to the source device or user that has transmitted the playback request for the second content. This is inconvenient for the user of the source device that has transmitted the playback requests for the first content and the second content because the second content is not played back although the user wants to switch from the first content that is being played back to the second content.

SUMMARY

Accordingly, in some embodiments, when playback of content is newly requested to a communication device that is playing back content, playback of the content is appropriately controlled on the basis of whether or not the source devices or users that have transmitted individual playback requests are identical to each other.

A communication device according to an aspect of some embodiments includes a first receiving unit configured to receive a playback request for content; a playback unit configured to play back the content based on the playback request received by the first receiving unit; an obtaining unit configured to obtain device identification information for identifying a source device that has transmitted the playback request received by the first receiving unit; and a control unit configured to perform, in a case where the first receiving unit receives a playback request for second content while the playback unit is playing back first content, control to start playing back the second content, based on a fact that a source device identified by first device identification information is identical to a source device identified by second device identification information, the first device identification information identifying a source device that has transmitted a playback request for the first content, the second device identification information identifying a source device that has transmitted the playback request for the second content, and control to continue playing back the first content, based on a fact that the source device identified by the first device identification information is different from the source device identified by the second device identification information.

A communication device according to another aspect of some embodiments includes a first receiving unit configured to receive a playback request for content; a playback unit configured to play back the content based on the playback request received by the first receiving unit; an obtaining unit configured to obtain user identification information for identifying a user related to the playback request received by the first receiving unit; and a control unit configured to perform, in a case where the first receiving unit receives a playback request for second content while the playback unit is playing back first content, control to start playing back the second content, based on a fact that a user identified by first user identification information is identical to a user identified by second user identification information, the first user identification information identifying a user related to a playback request for the first content, the second user identification information identifying a user related to the playback request for the second content, and control to continue playing back the first content, based on a fact that the user identified by the first user identification information is different from the user identified by the second user identification information.

Further features of various embodiments will become apparent from the following description of exemplary embodiments with reference to the attached drawings.

DESCRIPTION OF THE EMBODIMENTS

Hereinafter, some embodiments will be described in detail. The configurations illustrated in the following embodiments are examples, and some embodiments are not limited to the illustrated configurations.

Figure 1:
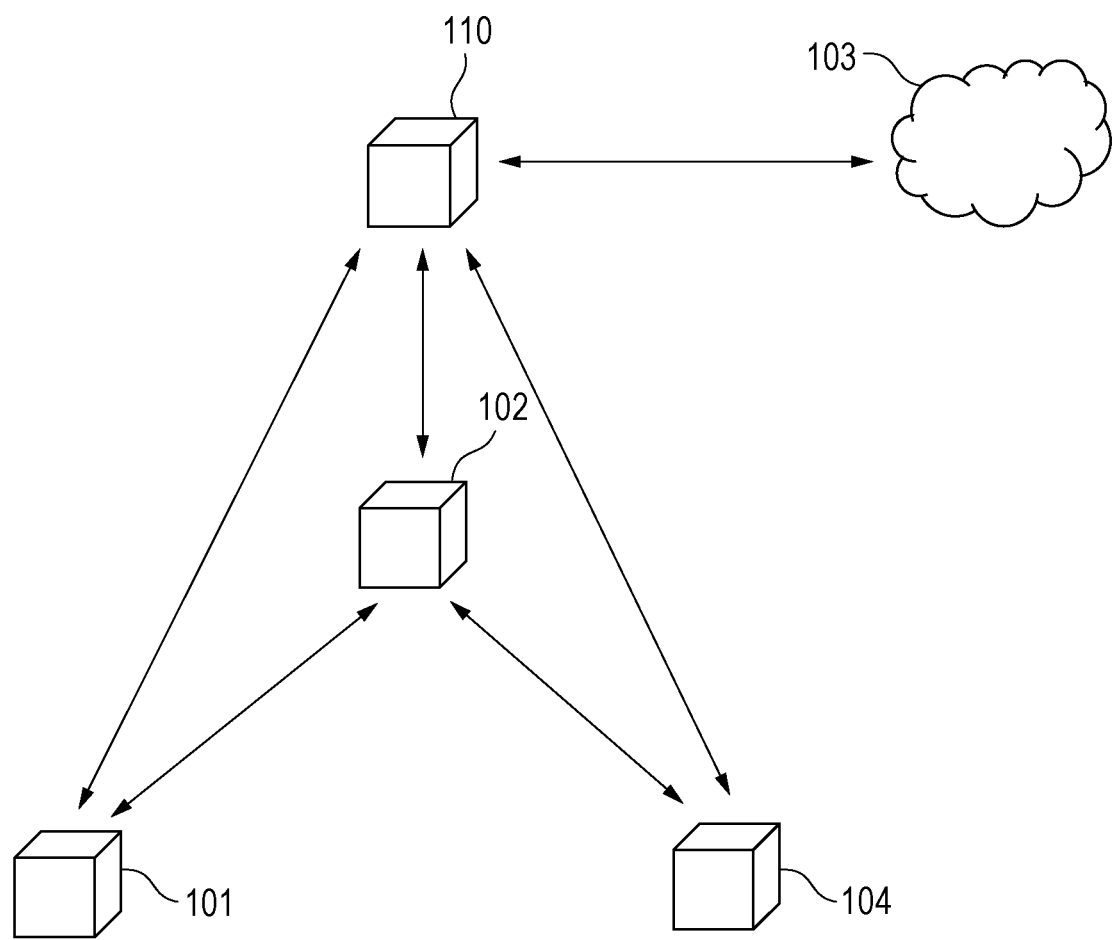
FIG. 1 is a diagram illustrating the configuration of a network in which a communication device participates.

FIG. 1 illustrates the network configuration of a communication system including a communication device 102 according to the present embodiment. A communication device 101 and the communication device 102 are capable of performing wireless communication conforming to, for example, the Wi-Fi Direct standard. In this case, the communication device 101 and the communication device 102 directly and wirelessly communicate with each other without using an access point (AP) 110. Similarly, a communication device 104 and the communication device 102 directly and wirelessly communicate with each other without using the AP 110. The communication device 101, the communication device 102, and the communication device 104 may perform wireless communication via the AP 110 over an infrastructure network conforming to the IEEE 802.11 series standard. IEEE stands for Institute of Electrical and Electronics Engineers.

The communication device 101, the communication device 102, and the communication device 104 are capable of communicating with a cloud server 103 via the AP 110. The communication device 101, the communication device 102, and the communication device 104 are capable of obtaining content from the cloud server 103 and playing back the content. Here, content is data including any one of image data, audio data, moving image data, and video data. Video data is data including both audio data and moving image data. Alternatively, content may be data including, in addition to these types of data, at least any one of software data for playing back these types of data, GUI data, and meta data.

In the present embodiment, the communication device 101, the communication device 102, and the communication device 104 each have a mirroring function. With the mirroring function, the communication device 101 or the communication device 104 (source device) is able to share a screen that is displayed on the source device or audio that is being played back by the source device with the communication device 102 (sink device). Specifically, the source device transmits to the sink device a stream of data (content) including at least one of image data and audio data as information of the screen that is displayed on the source device or the audio that is being played back by the source device. At this time, the image data that is transmitted is encoded data of the screen that is displayed on the source device, and the audio data that is transmitted is encoded data of the audio that is being played back by the source device. Upon receiving the stream of content, the sink device plays back the image data or audio data included in the received content in synchronization with the source device. The communication device 101, the communication device 102, and the communication device 104 perform mirroring conforming to, for example, the Wi-Fi Miracast standard, and transmit/receive a stream through wireless communication conforming to the Wi-Fi Direct standard. Alternatively, the communication device 101, the communication device 102, and the communication device 104 may transmit/receive a stream through an infrastructure network. The source device may share at least one of the screen that is displayed on the source device and the audio that is being played back by the source device with the sink device. The source device does not necessarily transmit audio data to the sink device when the audio is not to be shared by mirroring, and does not necessarily transmit image data to the sink device when the image is not to be shared.

The communication device 101, the communication device 102, and the communication device 104 each have a direct streaming function in addition to or instead of the mirroring function. With the direct streaming function, the communication device 101 or the communication device 104 (source device) transmits to the communication device 102 (sink device) data (content) including at least one of the image data and the audio data stored in the source device. The sink device is able to play back the content received from the source device. In this case, the source device may transmit the content in the original encoding format to the sink device without decoding and re-encoding the content. The communication device 101, the communication device 102, and the communication device 104 perform direct streaming conforming to, for example, the Wi-Fi Miracast standard.

The communication device 101, the communication device 102, and the communication device 104 each have a content redirection function in addition to or instead of the mirroring function and the direct streaming function. With the content redirection function, the communication device 101 or the communication device 104 (source device) is able to cause the communication device 102 (sink device) to obtain data (content) including at least one of image data and audio data from an external device different from the source device and play back the data. Here, the external device is the cloud server 103, for example. Specifically, when a playback request for content in the external device is transmitted from the source device to the sink device, the sink device obtains the content from the external device in response to the received playback request and plays back the content. The playback request transmitted from the source device to the sink device includes content-related information, and the sink device obtains the content from the external device by using the content-related information included in the playback request and plays back the content. The content-related information is, for example, an identifier for identifying the content, a service name for identifying a service that is to be used to play back the content, or information indicating where the content is located (e.g., URI, URL). The playback request may include all of these pieces of information or may include only one or some of these pieces of information. The identifier of the content is an identifier for uniquely identifying the content. The information indicating where the content is located is information indicating a region where the content is stored in the external device. URI stands for Uniform Resource Identifier, and URL stands for Uniform Resource Locator. The communication device 101, the communication device 102, and the communication device 104 perform content redirection conforming to, for example, the Wi-Fi Miracast standard.

The communication device 101 and the communication device 104 may specifically be a tablet, a smartphone, a personal computer (PC), a mobile phone, a camera, a video camera, or the like, but are not limited thereto. The communication device 101 and the communication device 104 may be a communication device capable of performing processing corresponding to at least any one of the mirroring function, the direct streaming function, and the content redirection function as a source device.

The communication device 102 may specifically be a tablet, a smartphone, a PC, a mobile phone, a television receiver, a television adaptor, a set top box, a head mounted display, or the like. Alternatively, the communication device 102 may specifically be a projector, a display, a car navigation device, or the like, but is not limited thereto. The communication device 102 may be a communication device capable of performing processing corresponding to at least any one of the mirroring function, the direct streaming function, and the content redirection function as a sink device.

In the present embodiment, while the communication device 102 is performing mirroring, direct streaming, or content redirection with the communication device 101 and is playing back content in response to a playback request received from the communication device 101, a new playback request for content is transmitted to the communication device 102. The communication device 102 determines whether or not each of the playback request for the content that is being played back and the new playback request for content includes user identification information for identifying a user. If each playback request includes user identification information and if both of the pieces of user identification information are identical to each other, the communication device 102 starts playing back content in response to the new playback request. On the other hand, if each playback request includes user identification information and if both of the pieces of user identification information are different from each other, the communication device 102 continues playing back the content that is being played back. Accordingly, if the users who have transmitted the two playback requests are identical to each other, the communication device 102 starts playing back content in response to the new playback request, and thereby the user is able to start playing back the next content without performing a process of stopping playback of the preceding content. On the other hand, if the users who have transmitted the two playback requests are different from each other, the communication device 102 continues playing back the content that is being played back, and thereby the user is able to continue viewing or listening of the content that is being played back even if a playback request is made by another user by an interrupt. The communication device 102 controls playback of content on the basis of user identification information included in a playback request, thereby being able to increase the convenience for the user.

If user identification information is not included in at least one of the playback request for the content that is being played back by the communication device 102 and the new playback request for content, the communication device 102 determines whether or not the source communication devices (source devices) that have transmitted the individual playback requests are identical to each other. If the source devices that have transmitted the two playback requests are identical to each other, the communication device 102 starts playing back new content in response to the received playback request. On the other hand, if the source devices that have transmitted the two playback requests are different from each other, the communication device 102 continues playing back the content that is being played back. Accordingly, if the source devices that have transmitted the two playback requests are identical to each other, the communication device 102 starts playing back content in response to the new playback request, and thereby the user is able to start playing back the next content without performing a process of stopping playback of the preceding content. On the other hand, if the source devices that have transmitted the two playback requests are different from each other, the communication device 102 continues playing back the content that is being played back, and thereby the user is able to continue viewing or listening of the content that is being played back even if a playback request is made by another user by an interrupt.

The communication device 102 may control playback of content on the basis of whether or not the source devices that have transmitted the individual playback requests are identical to each other regardless of whether or not the playback request for the content that is being played back and the new playback request for content include user identification information.

In the present embodiment, each device illustrated in FIG. 1 performs wireless communication conforming to the IEEE 802.11 series standard. In addition to this, each device may use wireless communication conforming to another wireless communication scheme, such as Bluetooth®, NFC, UWB, ZigBee, or MBOA. UWB stands for Ultra Wide Band, and MBOA stands for Multi Band OFDM Alliance. OFDM stands for Orthogonal Frequency Division Multiplexing. NFC stands for Near Field Communication. The UWB includes wireless USB, wireless 1394, WiNET, and the like. In addition, a communication scheme conforming to a wired communication scheme, such as wired LAN, may be used.

In the present embodiment, the communication device 101, the communication device 102, and the communication device 104 perform mirroring by using the Wi-Fi Miracast standard. Alternatively, another communication scheme, such as Airplay or Chromecast, may be used. The communication device 101, the communication device 102, and the communication device 104 may use a communication scheme different from the Wi-Fi Miracast standard also for direct streaming and content redirection.

According to the above description, the communication device 101, the communication device 102, and the communication device 104 perform mirroring through a network conforming to the Wi-Fi Direct standard or an infrastructure network. In addition to this, the communication device 101, the communication device 102, and the communication device 104 are capable of establishing an ASP session through these networks and performing mirroring through the established ASP session. ASP stands for Application Service Platform. In addition, the communication device 101, the communication device 102, and the communication device 104 may perform direct streaming or content redirection through the ASP session.

Figure 2:
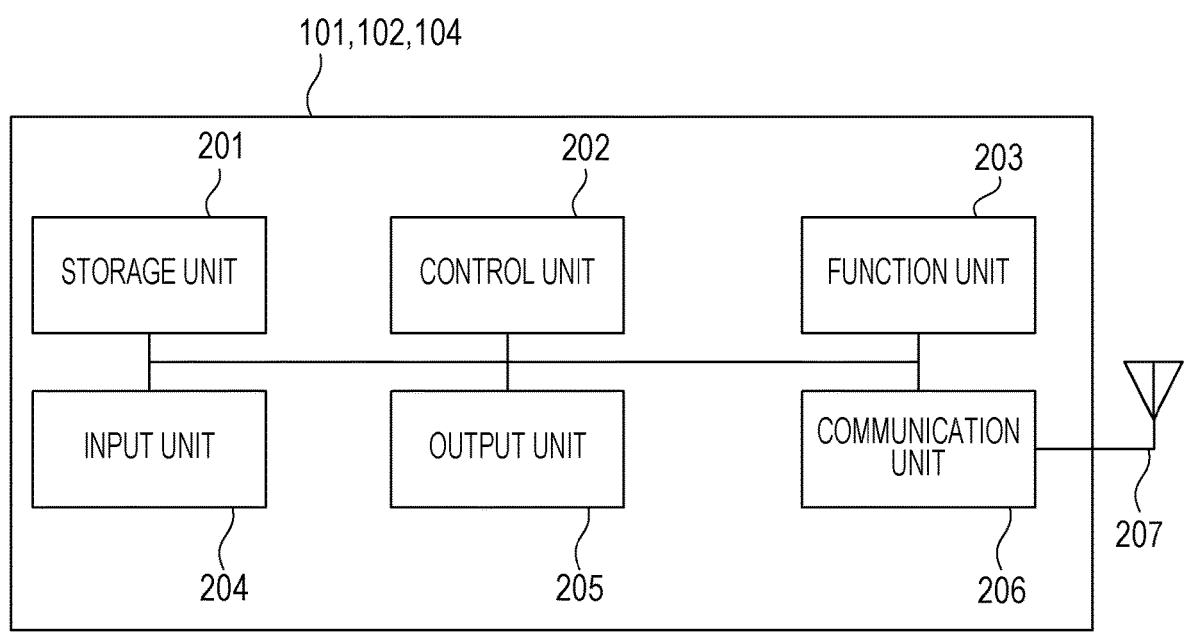
FIG. 2 is a diagram illustrating the hardware configuration of the communication device.

FIG. 2 illustrates the hardware configuration of the communication device 102.

The communication device 102 includes a storage unit 201, a control unit 202, a function unit 203, an input unit 204, an output unit 205, a communication unit 206, and an antenna 207.

The storage unit 201 is constituted by one or more memories, such as a ROM or a RAM, and stores a computer program for performing various operations, which will be described below, and various pieces of information, such as communication parameters used for wireless communication. ROM stands for Read Only Memory, and RAM stands for Random Access Memory. As the storage unit 201, a storage medium such as a flexible disk, a hard disk, an optical disc, a magneto-optical disc, a CD-ROM, a CD-R, a magnetic tape, a nonvolatile memory card, or a DVD may be used as well as a memory, such as a ROM or a RAM. The storage unit 201 may include a plurality of memories or the like.

The control unit 202 is constituted by one or more processors, such as a CPU or an MPU, and controls the entire communication device 102 by executing the computer program stored in the storage unit 201. CPU stands for Central Processing Unit, and MPU stands for Micro-Processing Unit, which function as a computer. The control unit 202 may control the entire communication device 102 through cooperation between the computer program stored in the storage unit 201 and an operating system (OS). The control unit 202 may include a plurality of processors, such as a multi-core processor, and the entire communication device 102 may be controlled by the plurality of processors.

The control unit 202 executes the computer program stored in the storage unit 201, thereby implementing the mirroring function as a sink device. The mirroring function as a sink device is a function of receiving content including image data obtained by capturing a screen displayed on a source device and encoding the screen, and audio data obtained by encoding audio that is being played back; decoding the content, and playing back the content in synchronization with the source device.

Also, the control unit 202 executes the computer program stored in the storage unit 201, thereby implementing the content redirection function as a sink device. The content redirection function as a sink device is a function of obtaining content to be played back from an external device different from a source device by using information received from the source device and playing back the content. Furthermore, with the content redirection function as a sink device, the communication device 102 is able to control playback of content performed by the communication device 102 on the basis of playback control information received from the source device.

Also, the control unit 202 executes the computer program stored in the storage unit 201, thereby implementing the direct streaming function as a sink device. The direct streaming function as a sink device is a function of receiving content transmitted from a source device and playing back the content.

Also, the control unit 202 controls the function unit 203 to perform predetermined processing, such as image capturing or content viewing. The function unit 203 is a hardware unit used by the communication device 102 to perform predetermined processing. For example, when the communication device 102 is a camera, the function unit 203 is an image capturing unit that performs image capturing.

The input unit 204 receives various operations from a user. The output unit 205 performs various types of output to the user through a monitor screen or a speaker. Here, output from the output unit 205 may be displayed on a screen, may be output from a speaker, may be output by a vibration, or the like. The monitor screen output from the output unit 205 is a monitor screen of the communication device 102 or a monitor screen of another device connected to the communication device 102. Alternatively, a single module, such as a touch screen, may serve as both the input unit 204 and the output unit 205. The input unit 204 and the output unit 205 may be separated from the communication device 102. The output unit 205 performs display on a screen, performs audio output from a speaker, performs output of a vibration, or the like, thereby implementing a function as a notifying unit that notifies a user. The input unit 204 and the output unit 205 may be integrated with or separated from the communication device 102. The communication device 102 may have, as the input unit 204, a hard key, a touch screen, or the like integrated with the communication device 102 or integrated with a remote control separated from the communication device 102. The communication device 102 may have, as the output unit 205, a monitor screen, a light source, or the like integrated with the communication device 102 or integrated with a display or a speaker separated from the communication device 102.

The communication unit 206 controls wireless communication conforming to the IEEE 802.11 series, controls wired communication using a wired LAN or the like, and controls Internet protocol (IP) communication. Also, the communication unit 206 controls an antenna 207 to transmit/receive a radio signal for wireless communication. The communication device 102 communicates content, such as image data, document data, or video data, with the communication device 101 by using the communication unit 206.

The communication device 101 has a hardware configuration similar to that of the communication device 102. The control unit 202 of the communication device 101 executes the computer program stored in the storage unit 201, thereby implementing the mirroring function as a source device. The communication device 104 is similar to the communication device 101. The mirroring function as a source device is a function of transmitting to a sink device content including image data obtained by capturing a screen displayed on the source device and encoding the screen or audio data obtained by encoding audio that is being played back.

The content redirection function as a source device may be implemented through execution of the computer program stored in the storage unit 201 by the control unit 202. The content redirection function as a source device is a function of transmitting to a sink device information that is necessary for the sink device to obtain content to be played back by the sink device from an external device different from the source device. Furthermore, with the content redirection function as a source device, the communication device 101 is able to transmit to a sink device playback control information for controlling playback of content that is being played back by the sink device.

The direct streaming function as a source device may be implemented through execution of the computer program stored in the storage unit 201 by the control unit 202. The direct streaming function as a source device is a function of transmitting content held in the storage unit 201 to a sink device.

The communication device 101, the communication device 102, and the communication device 104 are devices capable of performing both image display and audio playback. Alternatively, at least one of the communication device 101, the communication device 102, and the communication device 104 may be a device capable of performing either image display or audio playback.

Figure 3:
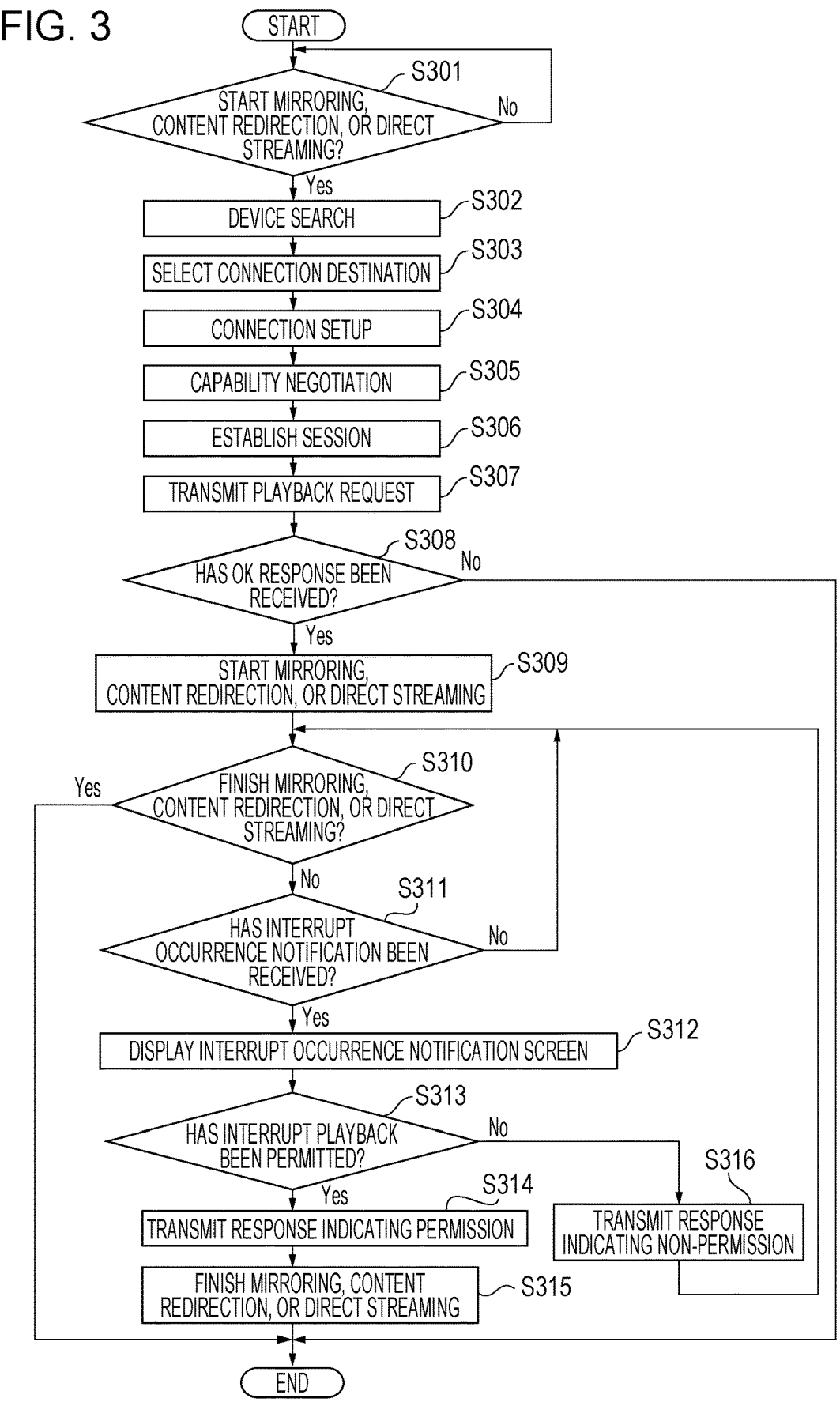
FIG. 3 is a flowchart illustrating an example of processing performed when a source device performs any one of mirroring, content redirection, and direct streaming with a sink device.
Figure 4:
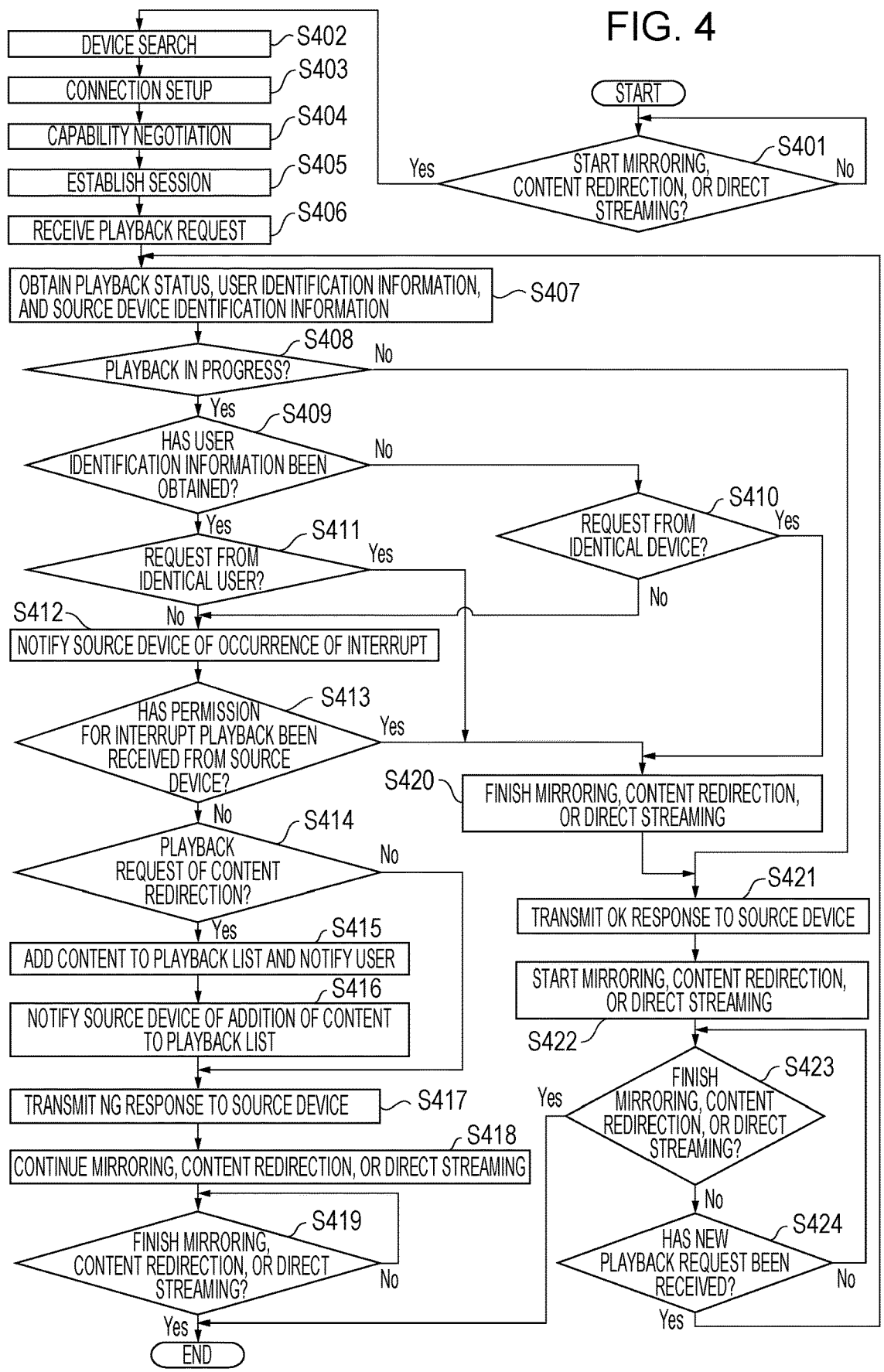
FIG. 4 is a flowchart illustrating an example of processing performed when the sink device performs any one of mirroring, content redirection, and direct streaming with the source device.

Now, a description will be given of processing that is performed when a new playback request for content interrupts while the communication device 101 and the communication device 102 are performing any one of mirroring, direct streaming, and content redirection, with reference to FIGS. 3 and 4. FIG. 3 is a flowchart illustrating the processing that is performed when the communication device 101 reads the computer program stored in the storage unit 201 to the control unit 202 and executes the computer program. FIG. 4 is a flowchart illustrating the processing that is performed when the communication device 102 reads the computer program stored in the storage unit 201 to the control unit 202 and executes the computer program.

S301 in FIG. 3 is started upon power-on of the communication device 101. Alternatively, S301 may be started upon startup of a predetermined application in the communication device 101. S401 in FIG. 4 is started upon power-on of the communication device 102. Alternatively, S401 may be started upon startup of a predetermined application in the communication device 102.

First, the communication device 101 determines whether or not to start any one of mirroring, direct streaming, and content redirection (S301). The determination is made on the basis of whether or not a user has performed a starting operation for any one of mirroring, direct streaming, and content redirection through the input unit 204 of the communication device 101. The starting operation for any one of mirroring, direct streaming, and content redirection may be pressing of a control button by the user. Alternatively, the communication device 101 may regard a user operation, such as a predetermined keyboard operation or mouse operation, a touch operation, or a joystick operation, as a starting operation. Alternatively, the communication device 101 may regard a user operation, such as a predetermined gesture, pressing of a control button of a remote control, start of playback of predetermined content, or startup of a predetermined application, as a starting operation. If no starting operation has been performed, the communication device 101 determines not to start any of mirroring, direct streaming, and content redirection (No in S301), and performs S301 again. On the other hand, if a starting operation has been performed, the communication device 101 determines to start any one of mirroring, direct streaming, and content redirection (Yes in S301), and then performs S302.

The communication device 101 may automatically start any one of mirroring, direct streaming, and content redirection regardless of a starting operation by the user. For example, the communication device 101 may start any one of mirroring, direct streaming, and content redirection in response to elapse of a predetermined time from the startup of a predetermined application or the start of playback of predetermined content. Alternatively, the communication device 101 may start any one of mirroring, direct streaming, and content redirection in response to recognition of a predetermined image or predetermined person through the input unit 204.

Similarly, the communication device 102 determines whether or not to start any one of mirroring, direct streaming, and content redirection (S401). The determination is performed similarly to S301. If the communication device 102 determines not to start any of mirroring, direct streaming, and content redirection (No in S401), the communication device 102 performs S401 again. On the other hand, if the communication device 102 determines to start any one of mirroring, direct streaming, and content redirection (Yes in S401), the communication device 102 performs S402.

Subsequently, a device search is performed between the communication device 101 and the communication device 102 (S302 and S402). The communication device 101 and the communication device 102 search for a device that performs any one of mirroring, direct streaming, and content redirection through wireless communication conforming to the Wi-Fi Direct standard or an infrastructure network.

In a case where the communication device 101 and the communication device 102 perform a device search by using a scheme conforming to the Wi-Fi Direct standard, the processing from S302 to S304 and from S402 to S403 is performed in the following manner. Specifically, the communication device 101 transmits a probe request conforming to the IEEE 802.11 series standard as a device search request, and then the communication device 102 transmits a probe response in response to the probe request. Accordingly, the communication device 101 and the communication device 102 find each other. The devices that transmit a probe request/response may be reversed.

The communication device 102 may make the determination in S401 on the basis of whether or not the communication device 102 has received a radio signal for a device search from the communication device 101. The communication device 102 may make an affirmative determination in S401 in response to receipt of a probe request as a radio signal for a device search from the communication device 101.

The communication device 101 displays a list of one or more devices that have been found on a monitor screen, which is the output unit 205. The user selects a device for performing mirroring from the list of devices displayed on the monitor screen of the communication device 101. The communication device 101 selects the device selected by the user as a connection destination device with which mirroring is to be performed (S303). In this operation, a connection destination device may be selected by the communication device 101 on the basis of a history of a device that has previously performed any one of mirroring, direct streaming, and content redirection. Specifically, if there is a device that has previously performed any one of mirroring, direct streaming, and content redirection among the detected devices, the communication device 101 selects the device as a connection destination device. Alternatively, the communication device 101 may select, from among the detected devices, a device that is the closest to the communication device 101 or a device that has the best communication quality as a connection destination device. Alternatively, the selection of a connection destination device in S303 may be performed by the communication device 102.

In this flowchart, a probe request/response is used in the device search. Alternatively, a radio signal, such as Beacon conforming to the IEEE 802.11 series standard, may be used on the basis of the Wi-Fi Miracast standard. Alternatively, the communication device 101 or the communication device 102 may perform the device search by using NFC, QR code®, Bluetooth Low Energy, or the like. For example, when the communication device 101 has an NFC communication function, pairing of the communication device 101 and the communication device 102 can be performed through an NFC touch operation, and the communication thereafter can be performed on the basis of the Wi-Fi Miracast standard.

Before performing S304 and S403, the communication device 101 and the communication device 102 may perform a service search conforming to the Wi-Fi Direct standard. The service search enables at least one of the communication device 101 and the communication device 102 to obtain information about the service provided by the other device.

Subsequently, the communication device 101 performs connection setup with the connection destination device selected in S303 (S304). Here, it is assumed that the communication device 102 is selected as a connection destination device in S303. Thus, the communication device 102 also performs connection setup with the communication device 101 (S403). Specifically, the communication device 101 and the communication device 102 may perform connection processing based on Wi-Fi Miracast and then perform connection processing based on TCP. As a result of these connection processing operations, the connection setup between the communication device 101 and the communication device 102 is completed. TCP stands for Transmission Control Protocol.

Now, a detailed procedure of S304 and S403 will be described. To determine a communication device serving as a group owner (GO) that plays a role of establishing a network in wireless communication conforming to the Wi-Fi Direct standard, the communication device 101 transmits a GO negotiation request. This signal includes an intent value indicating the degree at which the communication device 101 wants to be a GO.

The communication device 102 receives the GO negotiation request and transmits a GO negotiation response including an intent value of the communication device 102 in response thereto. The communication device 101 receives the GO negotiation response, compares the intent value of the communication device 101 with the intent value of the communication device 102, and determines the communication device whose intent value is larger to be a GO. The communication device whose intent value is smaller is determined to be a CL, which plays a role of participating in the network established by the GO.

The communication device 101 transmits a GO negotiation confirm including a result of comparing the intent values to the communication device 102. In the present embodiment, the intent value of the communication device 101 is larger than the intent value of the communication device 102, and thus it is assumed that the communication device 101 serves as a GO and the communication device 102 serves as a CL.

Thereafter, parameter information that is necessary to establish the network connection between the communication device 101 and the communication device 102, such as information about connection and security, is shared, for example by using the WPS scheme. WPS stands for Wi-Fi Protected Setup. On the basis of the exchanged parameter information, the communication device 102 serving as a CL transmits an association request to the communication device 101 serving as a GO. The communication device 101 receives the signal and transmits an association response in response thereto.

Accordingly, the connection processing based on Wi-Fi Miracast conforming to the Wi-Fi Direct standard between the communication device 101 and the communication device 102 is completed. In the present embodiment, the communication device 101 serves as a GO and the communication device 102 serves as a CL, but this relationship may be reversed. Alternatively, each radio signal transmitted by the GO may be transmitted by the CL. In this case, the radio signal transmitted by the CL is received by the GO. To perform the connection processing based on Wi-Fi Miracast, the communication device 101 and the communication device 102 may use Beacon, Reassociation, or the like as well as the above-described radio signal. In addition, the communication device 101 and the communication device 102 may use P2P Invitation, Provision Discovery, or the like.

Subsequently, TCP connection is established between the communication device 101 and the communication device 102. This connection is established through three-way handshake performed between the communication device 101 serving as a TCP server and the communication device 102 serving as a TCP client.

In this way, the connection processing based on Wi-Fi Miracast is completed and the TCP connection is established between the communication device 101 and the communication device 102. Accordingly, connection setup is completed.

In a case where the communication device 101 and the communication device 102 search for a device to perform mirroring through an infrastructure network, S302 to S304 and S402 to S403 are performed in the following manner.

Searching for a device to perform mirroring through an infrastructure network is performed by multicast DNS (mDNS). DNS stands for Domain Name System. First, the communication device 101 multicasts a DNS packet to other communication devices participating in the infrastructure network via the AP 110 connected to the communication device 101. The communication device 101 receives a response from a device capable of performing mirroring via the AP 110, thereby detecting the device. Specifically, the communication device 101 transmits a DNS packet including a DNS record via the AP 110. The DNS record indicates that the communication device 101 is searching for a communication device capable of performing wireless communication conforming to the Wi-Fi Miracast standard by designating the communication device. The DNS record includes one identifier, for example "displaysrc" representing a source device or "display" representing a sink device. The communication device 101 searches for a sink device as a device to perform mirroring, and thus includes "display" representing a sink device in the DNS record. The communication device 101 is capable of transmitting a DNS packet an arbitrary number of times at an arbitrary transmission interval. In the case of performing device search, the communication device 101 repeatedly transmit a DNS packet until the number of transmissions reaches a predetermined number. Alternatively, the communication device 101 may repeatedly transmit a DNS packet until a predetermined time elapses. In addition, the communication device 101 may stop transmitting a DNS packet when receiving a response from a predetermined number of other communication devices.

After searching for a device to perform mirroring through the infrastructure network, the communication device 101 displays a search result, and then selection of a connection destination device is performed. The display of the search result and the selection of a connection destination device are performed similarly to S303.

Subsequently, the communication device 101 transmits an mDNS inquiry to the selected connection destination device (here, the communication device 102) via the AP 110. The mDNS inquiry transmitted here is a signal for inquiring ability information of the communication device 102, and a port number and a host name to be used in communication between the communication device 101 and the communication device 102. The ability information of the communication device 102 inquired in this mDNS inquiry is information indicating whether the communication device 102 is a sink device, a source device, or a dual-role device. The communication device 102 receives the mDNS inquiry and transmits an mDNS response, including the ability information of the communication device 102, the port number, and the host name, to the communication device 101. The communication device 101 receives the response and completes the connection setup with the communication device 102. Alternatively, the communication device 101 may establish a TCP connection by performing three-way handshake with the communication device 102.

The processing performed by the communication device 101 and the communication device 102 after completing connection setup is the same in the case of performing mirroring through a network conforming to the Wi-Fi Direct standard and in the case of performing mirroring through an infrastructure network.

Subsequently, the communication device 101 and the communication device 102 perform capability negotiation (S305 and S404). The Wi-Fi Miracast standard specifies that a real time streaming protocol (RTSP) is to be used in capability negotiation. The RTSP is a protocol for controlling streaming. The TCP is typically used as a transport protocol in a lower layer. In the capability negotiation, predetermined messages RTSP M1 to M4 are exchanged between the communication device 101 and the communication device 102. By exchanging RTSP messages, the communication device 101 obtains the ability information of the communication device 102, determines parameters to be used, and notifies the communication device 102 of the parameters. The communication device 102 sets the parameters obtained from the communication device 101. Specifically, the ability information is, regarding a screen, for example, information indicating the resolution, frame rate, and so forth of the screen supported by the communication device 102. Regarding audio, the ability information is information indicating the codec, sampling frequency, and so forth supported by the communication device 102. As a result of capability negotiation, the type of coding method for a screen or audio, the resolution and frame rate of video, and so forth to be used for mirroring are determined between the communication device 101 and the communication device 102. The ability information transmitted and received between the communication device 101 and the communication device 102 may be part of these pieces of information.

After capability negotiation is completed, the communication device 101 and the communication device 102 establish a session conforming to the Wi-Fi Miracast standard (S306 and S405). In the Wi-Fi Miracast standard, predetermined messages RTSP M5 to M7 are exchanged between the communication device 101 and the communication device 102 to establish a session. Through the exchange of RTSP messages, the port number to be used between the communication device 101 and the communication device 102 is set, and a session is established.

After establishing the session with the communication device 102, the communication device 101 transmits a playback request (S307). The playback request transmitted here is a playback request of mirroring, direct streaming, or content redirection that is determined to be started in S301.

For example, in the case of starting direct streaming, the communication device 101 exchanges an RTSP M3 message and an RTSP M4 message again with the communication device 102 with which the session has been established, thereby starting direct streaming. At this time, the RTSP M4 request transmitted by the communication device 101 includes wfd2-direct-streaming-mode that is set to active to request starting of direct streaming. The playback request transmitted from the communication device 101 to the communication device 102 is not limited to the RTSP M4 request, and may be any playback request including a parameter for identifying a playback request of direct streaming.

For example, in the case of starting content redirection, the communication device 101 exchanges an RTSP M3 message and an RTSP M4 message again with the communication device 102, similarly to direct streaming. At this time, the RTSP M4 request transmitted by the communication device 101 includes a parameter including content-related information to request starting of content redirection. The playback request transmitted from the communication device 101 to the communication device 102 is not limited to the RTSP M4 request, and may be any playback request including a parameter for identifying a playback request of content redirection.

For example, in the case of starting mirroring, the communication device 101 may transmit to the communication device 102 a playback request including a parameter for identifying a playback request of mirroring. Alternatively, a message that is transmitted to the communication device 102 before establishing the session and that does not include a parameter indicating a playback request of content redirection or direct streaming may be used as a playback request of mirroring. Specifically, the RTSP M4 message that is transmitted to the communication device 102 in S305 and that does not include a parameter of content redirection or direct streaming may be used as a playback request of mirroring. In this case, the communication device 101 skips S307.

Upon receiving the playback request from the communication device 101 (S406), the communication device 102 obtains a playback status of the communication device 102, user identification information included in the received playback request, and identification information of the source device (device identification information) (S407). The playback status of the communication device 102 is information indicating whether or not the communication device 102 is playing back content in any one of mirroring, content redirection, and direct streaming. If the communication device 102 does not receive a playback request by the time a predetermined time elapses in S406, the communication device 102 may determine that the communication device 101 has transmitted a playback request of mirroring and may perform S407.

The user identification information is information for identifying the user who is operating the communication device 101 and can be obtained from the information included in the playback request. Alternatively, the communication device 102 may obtain the user identification information from the information included in each message received from the communication device 101 for establishing a session in S404 or S405. For example, in the case of content redirection, a user name (foo) may be included in a URI (for example, http://foo:password@xxx.jp), which is content-related information, and thus the user name obtained from the URI may be used as user identification information. The user identification information can be obtained in some cases, and not in other cases.

The identification information of the source device is information for identifying the communication device 101 and can be obtained by referring to a source MAC address included in a wireless LAN frame together with the playback request received in S406. The MAC address stands for Media Access Control address. Alternatively, the identification information of the source device may be obtained by referring to, instead of the MAC address, the P2P device address included in the wireless LAN frame or a source IP address. Alternatively, information such as a UUID for identifying the communication device 101 may be obtained by using another protocol. UUID stands for Universally Unique Identifier. The identification information of the source device may be obtained by referring to information included in each message received from the communication device 101 for establishing the session in S404 or S405. It is sufficient that at least one of the identification information of the source device and the user identification information be obtained.

It is sufficient that the user identification information be information identifying a user and that the identification information of the source device be information identifying the source device.

After performing S407, the communication device 102 determines whether or not the playback status of the communication device 102 is "in progress" (S408). The communication device 102 makes the determination in this operation on the basis of the playback status obtained in S407. If the communication device 102 is performing playback of content by any one of mirroring, direct streaming, and content redirection, the communication device 102 makes an affirmative determination in this operation. On the other hand, if the communication device 102 is not performing playback of content by any one of mirroring, direct streaming, and content redirection, the communication device 102 makes a negative determination in this operation.

If a negative determination is made in S408, the communication device 102 transmits to the communication device 101 a response indicating "OK" to the playback request received from the communication device 101 (S421).

Upon receiving the response to the playback request from the communication device 102, the communication device 101 determines whether or not the response indicates "OK" (S308). If the response received from the communication device 102 indicates "OK", the communication device 101 makes an affirmative determination in this operation. If the response received from the communication device 102 does not indicate "OK" (for example, "NG" or error), the communication device 101 makes a negative determination in this operation.

If the communication device 101 makes an affirmative determination in S308, the communication device 101 starts the operation designated in S301 among mirroring, content redirection, and direct streaming (S309). Similarly, the communication device 102 starts the operation corresponding to that started by the communication device 101 among mirroring, content redirection, and direct streaming (S422).

Specifically, in the case of starting mirroring, the communication device 101 generates content including at least one of image data obtained by capturing a screen displayed on the communication device 101 and encoding the screen, and audio data obtained by encoding audio that is being played back. Subsequently, the communication device 101 transmits the generated content as a stream to the communication device 102. The communication device 102 plays back the received content in synchronization with the communication device 101, thereby sharing the displayed screen or played back audio with the communication device 101.

In the case of starting direct streaming, the communication device 101 transmits the content stored therein as a stream to the communication device 102 in the original encoding format, without decoding and re-encoding the content. The communication device 102 receives and plays back the content. In this case, the communication device 101 does not need to play back the content, and thus the communication device 101 and the communication device 102 do not need to share the screen or audio. Alternatively, the user may control the playback of content in the communication device 102 by using the communication device 101.

In the case of starting content redirection, the communication device 102 obtains content from the cloud server 103 by using content-related information (for example, the URI of the content) received from the communication device 101, and plays back the content. Even while the communication device 102 is playing back the content, the session between the communication device 101 and the communication device 102 is maintained. The communication device 102 is able to transmit the content playback status (for example, a playback position, a playback speed, and the like) in the communication device 102 to the communication device 101 via the session. Also, the communication device 101 is able to transmit a control signal for controlling the content playback in the communication device 102 to the communication device 102 via the session. Thus, the user is able to control the content playback in the communication device 102 by using the communication device 101 as a remote control.

The communication device 101 determines whether or not to finish the playback of content started in S309 (S310). Similarly, the communication device 102 determines whether or not to finish the playback of content started in S422 (S423). The determination is made on the basis of whether or not a user operation of providing an instruction to finish the playback of content has been performed on the communication device 101 or the communication device 102. For example, if the communication device 101 receives a user operation of providing an instruction to finish the playback of content, the communication device 101 makes an affirmative determination in S310 and transmits to the communication device 102 a message providing an instruction to finish the playback of content. Alternatively, the communication device 101 may transmit to the communication device 102 a message for disconnecting the session. Upon receiving any of the messages, the communication device 102 makes an affirmative determination in S423. Alternatively, the communication device 102, not the communication device 101, may receive the user operation. In this case, the communication device 101 determines whether or not to finish the playback of content on the basis of a message received from the communication device 102.

In a case where the communication device 101 and the communication device 102 are performing direct streaming, the communication device 101 or the communication device 102 may determine to finish the playback of content after the communication device 102 has played back the content to the end. In a case where the communication device 102 is playing back content on the basis of a playback list having a plurality of pieces of content registered therein, the communication device 101 or the communication device 102 may determine to finish the playback of content after the piece of content registered at the end of the playback list has been played back to the end. The same applies to the case where the communication device 101 and the communication device 102 are performing content redirection.

If the communication device 101 and the communication device 102 make an affirmative determination in S310 and S423, respectively, the playback of content that is in progress is finished, and the flows of the flowcharts in FIGS. 3 and 4 are finished. At this time, the communication device 101 disconnects the session with the communication device 102. Similarly, the communication device 102 disconnects the session with the communication device 101.

On the other hand, if the communication device 102 makes a negative determination in S423, the communication device 102 determines whether or not a new playback request has been received (S424). The new playback request is a request to start playing back content different from the content that is currently being played back by the communication device 102. The communication device 102 makes a determination in this operation on the basis of whether or not a new playback request has been received. If a new playback request has not been received, the communication device 102 makes a negative determination in this operation and performs S423 again. On the other hand, if a new playback request has been received, the communication device 102 makes an affirmative determination in this operation and performs S407 again.

Returning to S408, if the communication device 102 is playing back content, the communication device 102 makes an affirmative determination in S408 and then performs S409.

The communication device 102 determines whether or not user identification information has been obtained (S409). The communication device 102 makes the determination on the basis of whether or not both the user identification information included in the newly received playback request and the user identification information included in the playback request for the content that is currently being played back have been obtained. If both the pieces of user identification information have been obtained, the communication device 102 makes an affirmative determination in this operation. If at least one of the pieces of user identification information has not been obtained, the communication device 102 makes a negative determination in this operation. Regarding the user identification information related to the content that is currently being played back, the communication device 102 may hold the user identification information obtained when receiving the playback request, or may obtain the user identification information again when receiving the new playback request.

If the communication device 102 makes a negative determination in S409, the communication device 102 determines whether or not the newly received playback request is from the communication device identical to the communication device that has transmitted the playback request for the content that is currently being played back (S410). The determination is made on the basis of whether or not the identification information of the source device obtained in S407 is identical to the identification information of the source device related to the content that is currently being played back. The identification information of the source device related to the content that is currently being played back is identification information that is obtained and held when the playback request for the content that is currently being played back is received. Alternatively, the identification information of the source device related to the content that is currently being played back may be obtained when the new playback request is received. If the identification information of the source device related to the newly received playback request matches the identification information of the source device related to the content that is currently being played back, that is, if both the playback requests are from the identical source device, the communication device 102 makes an affirmative determination in this operation. On the other hand, if the identification information of the source device related to the newly received playback request does not match the identification information of the source device related to the content that is currently being played back, the communication device 102 makes a negative determination in this operation. That is, if the individual playback requests are from different source devices, the communication device 102 makes a negative determination in this operation.

In S410, the communication device 102 makes a determination on the basis of whether or not the identification information of the source device related to the content that is currently being played back matches the identification information of the source device related to the newly received playback request. Alternatively, the communication device 102 may make the determination in S410 on the basis of whether or not the communication devices identified by the individual pieces of identification information match. Specifically, the communication device 102 makes an affirmative determination in S410 if the individual pieces of identification information do not match but the communication devices identified by the individual pieces of identification information match, and makes a negative determination in S410 if the communication devices identified by the individual pieces of identification information do not match. For example, it is assumed that the communication device 102 holds a table in which MAC addresses and UUIDs of individual communication devices are associated with each other. Also, it is assumed that the communication device 102 has obtained a MAC address as identification information of the source device related to the content that is currently being played back. It is assumed that the communication device 102 obtains a UUID as identification information related to the newly received playback request. If the communication device indicated by the UUID obtained by the communication device 102 is identical to the communication device indicated by the MAC address related to the content that is currently being played back, the communication device 102 makes an affirmative determination in S410.

If the communication device 102 makes an affirmative determination in S410, the communication device 102 finishes mirroring, content redirection, or direct streaming that is currently being performed (S420), and then performs S421 and the following operations. The communication device 102 may perform S420 after performing S421. If the communication device that has transmitted the newly received playback request is identical to the communication device that has transmitted the playback request for the content that was being played back, the communication device 102 may skip S420 and may start playing back the new content. For example, if the communication device 102 receives a new playback request for content by content redirection from the communication device 101 while playing back content by content redirection with the communication device 101, the communication device 102 may simply start playing back the new content. On the other hand, if the communication device 102 makes a negative determination in S410, the communication device 102 performs S412.

Returning to S409, if the communication device 102 makes an affirmative determination in S409, the communication device 102 determines whether or not the user who has transmitted the new playback request is identical to the user who has transmitted the playback request for the content that is currently being played back (S411). Specifically, the communication device 102 determines whether or not the user identification information included in the newly received playback request matches the user identification information included in the playback request for the content that is currently being played back. If both the pieces of user identification information match, the communication device 102 determines that both the playback requests are from the identical user and makes an affirmative determination in this operation. On the other hand, if the two pieces of user identification information do not match, the communication device 102 determines that the individual playback requests are from different users and makes a negative determination in this operation.

In S411, the communication device 102 makes a determination on the basis of whether or not the user identification information related to the content that is currently being played back matches the user identification information related to the newly received playback request. Alternatively, the communication device 102 may make a determination in S411 on the basis of whether or not the users identified by the individual pieces of user identification information match. Specifically, the communication device 102 makes an affirmative determination in S411 if the users identified by the individual pieces of user identification information match even if the individual pieces of user identification information do not match. The communication device 102 makes a negative determination in S411 if the users identified by the individual pieces of user identification information do not match. For example, it is assumed that the communication device 102 holds a table in which users and pieces of user identification information are associated with each other for individual services and that pieces of user identification information of different services used by the identical user are associated by the user in advance. In addition, it is assumed that the communication device 102 has obtained the user identification information of service A as the user identification information related to the content that is currently being played back. It is assumed that the communication device 102 obtains the user identification information of service B different from service A as the user identification information related to the newly received playback request. If the user identified by the user identification information of service A obtained by the communication device 102 is identical to the user identified by the user identification information of service B obtained by the communication device 102, the communication device 102 makes an affirmative determination in S411.

If the communication device 102 makes an affirmative determination in S411, the communication device 102 performs S420 and the following operations. When performing S420, the communication device 102 may determine whether or not the communication device as a source of the new playback request is identical to the communication device as a source of the playback request for the content that was being played back. If the communication devices as sources of the individual playback requests are different from each other, the communication device 102 may disconnect, when performing S420, the session with the communication device as a source of the playback request for the content that was being played back. In addition, the disconnection of the session with the communication device as a source of the playback request for the content that was being played back may be regarded as the processing of finishing mirroring or direct streaming. In the Wi-Fi Miracast standard, the communication device 102 is able to disconnect the session by transmitting an RTSP M8 (RTSP TEARDOWN) message.

On the other hand, if the communication device 102 makes a negative determination in S411, the communication device 102 notifies the communication device as the source of the playback request for the content that is being played back of the occurrence of an interrupt (S412). The communication device 102 performs S412 also when making a negative determination in S410. The communication device 102 is performing, for example, mirroring, content redirection, or direct streaming with the communication device 101, and notifies the communication device 101 of the occurrence of an interrupt if the communication device 102 receives a playback request from the communication device 104 while playing back content. Here, the communication device 102 notifies the communication device 101 of the occurrence of an interrupt by using an RTSP OPTION message, another RTSP message, or an arbitrary protocol.

If the communication device 101 is performing any one of mirroring, content redirection, and direct streaming and makes a negative determination in S310, the communication device 101 determines whether or not an interrupt occurrence notification has been received from the connection destination device (S311). By receiving an interrupt occurrence notification, the communication device 101 is able to detect that an interrupt has occurred in the communication device 102 that is performing mirroring or the like with the communication device 101. The communication device 101 makes a determination in this operation on the basis of whether or not an interrupt occurrence notification is received by the time a predetermined time elapses. If the communication device 101 does not receive an interrupt occurrence notification by the time the predetermined time elapses (No in S311), the communication device 101 performs S310 again. On the other hand, if the communication device 101 receives an interrupt occurrence notification by the time the predetermined time elapses (YES in S311), the communication device 101 performs S312.

Upon receiving the interrupt occurrence notification, the communication device 101 displays an interrupt occurrence notification screen to notify the user that an interrupt has occurred in the sink device (S312). Specifically, the control unit 202 of the communication device 101 displays the interrupt occurrence notification screen on a monitor screen which is the output unit 205 in response to receipt of the interrupt occurrence notification. The communication device 101 may hide the interrupt occurrence notification screen when a predetermined time elapses from when the interrupt occurrence notification screen is displayed or may hide the interrupt occurrence notification screen in response to receipt of a predetermined user operation.

Figure 5:
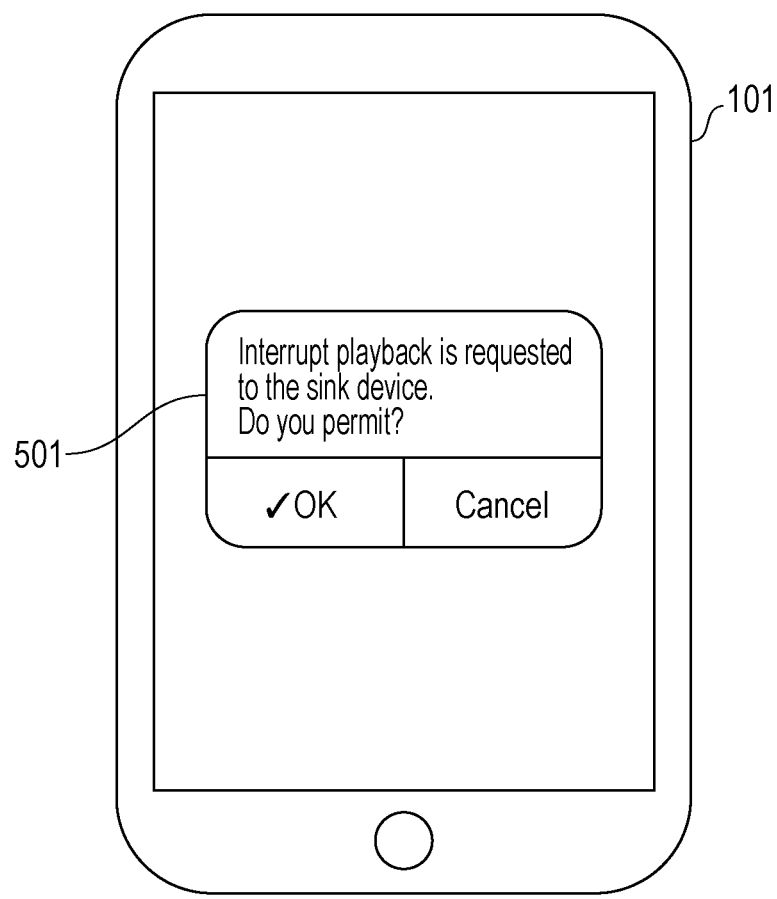
FIG. 5 is a diagram illustrating an example of an interrupt occurrence notification screen displayed on the source device.

FIG. 5 illustrates an example of an interrupt occurrence notification screen 501 displayed by the communication device 101. As illustrated in FIG. 5, the interrupt occurrence notification screen 501 notifies the user that an interrupt has occurred in the sink device (here, the communication device 102) and displays options of whether or not to permit interrupt playback in the sink device. The user is able to select permission for interrupt playback in the sink device ("OK" in FIG. 5) or non-permission for interrupt playback ("Cancel" in FIG. 5). If the interrupt occurrence notification screen 501 is hidden before the user selects permission or non-permission for interrupt playback, the communication device 102 determines that non-permission for interrupt playback has been selected. Alternatively, the communication device 102 may determine that permission for interrupt playback has been selected. In this way, by displaying the interrupt occurrence notification screen 501, the communication device 101 is able not only to notify the user that an interrupt has occurred but also to allow the user to select permission or non-permission for interrupt playback.

When the interrupt occurrence notification screen 501 is displayed on the communication device 101 while the communication device 101 is performing direct streaming or content redirection with the communication device 102, the communication device 102 continues playing back content. When the interrupt occurrence notification screen 501 is displayed on the communication device 101 while the communication device 101 is performing mirroring with the communication device 102, the communication device 101 and the communication device 102 may continue or pause the mirroring.

After displaying the interrupt occurrence notification screen 501, the communication device 101 determines whether or not interrupt playback has been permitted (S313). The determination in this operation is made on the basis of which of permission and non-permission for interrupt playback has been selected by the user on the interrupt occurrence notification screen 501 displayed in S312. If the user has selected permission for interrupt playback ("OK" in FIG. 5), the communication device 101 makes an affirmative determination in this operation. On the other hand, if the user has selected non-permission for interrupt playback ("Cancel" in FIG. 5), the communication device 101 makes a negative determination in this operation. If the user does not select either permission or non-permission for interrupt playback ("OK" or "Cancel" in FIG. 5) by the time a predetermined time elapses from when the interrupt occurrence notification screen is displayed, the communication device 101 makes a negative determination in S313.

In the present embodiment, the selection by the user of permission or non-permission for interrupt playback in S313 is received via the communication device 101. Alternatively, the selection by the user may be received via the communication device 102. Specifically, when the interrupt occurrence notification screen 501 is displayed on the communication device 101 and the communication device 102 is able to remote control the communication device 101, the communication device 101 may make the determination in S313 on the basis of a user operation received via the communication device 102. In the Wi-Fi Miracast standard, this remote operation function is called UIBC, which is executed by transmitting a user operation input to the communication device 102 as a sink device to the communication device 101 as a source device. UIBC stands for User Input Back Channel. The communication device 101 and the communication device 102 are able to enable the UIBC function by exchanging necessary information when performing capability negotiation in S305 and S404. Here, the necessary information includes information indicating whether or not the UIBC function is supported and information indicating the type of supported operation device (for example, a mouse, a keyboard, or the like). The communication device 101 and the communication device 102 are able to switch between effective and non-effective of the UIBC function any time from when S305 and S404 are completed to when the session is disconnected.

The communication device 101 may disable the function of the remote operation from the communication device 102 when receiving an interrupt occurrence notification from the communication device 102 in S311. Alternatively, the communication device 102 may disable the function of the remote operation from the communication device 102 when transmitting an interrupt occurrence notification to the communication device 101 in S412. In this case, the communication device 101 may enable the function of the remote operation from the communication device 102 in response to non-permission for interruption in S313. Alternatively, the communication device 102 may enable the function of the remote operation from the communication device 102 when receiving a response indicating non-permission for interrupt from the communication device 101 in S413 which will be described below. In this way, by disabling the remote operation from the communication device 102 when determining permission or non-permission for interrupt, a situation can be prevented from occurring where a user other than the user of the communication device 101 selects permission or non-permission for interrupt.

If the communication device 101 makes a negative determination in S313, the communication device 101 transmits to the communication device 102 a response indicating non-permission as a response to the interrupt occurrence notification (S316) and then performs S310 again. The communication device 101 may transmit a response indicating an error or "NG" instead of a response indicating non-permission in S316. If the communication device 101 pauses mirroring with the communication device 102 after displaying the interrupt occurrence notification screen 501, the communication device 101 restarts mirroring with the communication device 102 upon making a negative determination in S313.

On the other hand, if the communication device 101 makes a positive determination in S313, the communication device 101 transmits to the communication device 102 a response indicating permission as a response to the interrupt occurrence notification (S314). Subsequently, the communication device 101 finishes the operation that is being performed with the communication device 102 among mirroring, direct streaming, and content redirection (S315). At this time, the communication device 101 may disconnect the session with the communication device 102. Alternatively, the communication device 101 may transmit to the communication device 102 a message for finishing the operation that is being performed with the communication device 102 among mirroring, direct streaming, and content redirection, instead of the response indicating permission. The communication device 101 finishes the flow of the flowchart in FIG. 3 after performing S315.

Returning to S412 in FIG. 4, the communication device 102 notifies the communication device 101 of the occurrence of an interrupt in S412, and then determines whether or not a response indicating permission for interrupt playback has been received from the communication device 101 (S413). After performing S412, the communication device 102 waits for a response to the interrupt occurrence notification from the communication device 101 until a predetermined time elapses. If the received response indicates permission for interrupt playback, the communication device 102 makes an affirmative determination in this operation and then performs S420. Alternatively, the communication device 102 may make an affirmative determination in this operation in response to receipt from the communication device 101 of a message for finishing the operation that is being performed with the communication device 102 among mirroring, direct streaming, and content redirection.

On the other hand, if the received response does not indicate permission for interrupt playback, the communication device 102 makes a negative determination in this operation and then performs S414. If the communication device 102 does not receive a response to the interrupt occurrence notification within the predetermined time, the communication device 102 makes an affirmative determination in this operation. Alternatively, the communication device 102 may make a negative determination in this operation if the communication device 102 does not receive a response within the predetermined time.

If permission for interrupt playback is not obtained from the communication device 101, the communication device 102 determines whether the newly received playback request is a playback request of content redirection (S414). The determination in this operation is made on the basis of whether or not the playback request received in S406 includes a parameter indicating a playback request of content redirection. If the received playback request does not include a parameter indicating a playback request of content redirection, the communication device 102 makes a negative determination in this operation and then performs S417. On the other hand, if the received playback request includes a parameter indicating a playback request of content redirection, the communication device 102 makes an affirmative determination in this operation and then performs S415.

If the communication device 102 determines that the new interrupt playback request is a playback request of content redirection, the communication device 102 adds the content indicated by the newly received playback request to the playback list and notifies the user that the content has been added (S415). If a plurality of pieces of content have already been registered in the playback list, the communication device 102 adds the new content at the end of the playback list. If the communication device 102 is not using a playback list, the communication device 102 may create a new playback list, and may start playing back the content registered in the playback list after finishing playing back the content that is being played back. In addition, the communication device 102 displays, on a monitor screen which is the output unit 205, information indicating that new content has been registered in the playback list, thereby notifying the user. The communication device 102 may hide the notification after a predetermined time elapses from when the notification is displayed or in response to a predetermined operation by the user. Alternatively, whether or not new content can be added to the playback list may be inquired of the user. The new content may be added to the playback list if the user selects to add the content, whereas the new content is not added to the playback list if the user selects not to add the content.

The communication device 102 notifies the communication device as a source of the newly received interrupt playback request that information of the content has been added to the playback list (S416), and then performs S417. For example, if the communication device 102 receives an interrupt playback request of content redirection from the communication device 104, the communication device 102 notifies the communication device 104 that the content has been added to the playback list.

The communication device 102 may perform S414 to S416 only if the playback status obtained in S407 indicates that content is being played back by content redirection. Alternatively, the communication device 102 may simply skip S414 to S416.

The communication device 102 transmits an NG response as a response to the playback request to the communication device as the source of the newly received interrupt playback request (S417). In the case of performing S416, the communication device 102 may transmit an NG response as the notification in S416. In this case, the communication device 102 may skip S417. The communication device 102 may transmit a response indicating an error or a message for disconnecting the session with the communication device as the source of the newly received playback request, instead of the NG response. If the communication device 102 has performed S415, the communication device 102 may transmit in this operation an OK response indicating that the playback request has been received but the playback of the content in response to the playback request has not been started, instead of the NG response.

After performing S417, the communication device 102 continues the operation that is being performed among mirroring, content redirection, and direct streaming (S418).

The communication device 102 determines whether or not to finish the operation that is being performed among mirroring, content redirection, and direct streaming (S419). This determination is made similarly to S423. If the communication device 102 determines not to finish the operation that is being performed among mirroring, content redirection, and direct streaming (No in S419), the communication device 102 performs S419 again. On the other hand, if the communication device 102 determines to finish the operation that is being performed among mirroring, content redirection, and direct streaming (Yes in S419), the communication device 102 finishes the flow of the flowchart in FIG. 4.

A description has been given of the processing that is performed when an interrupt by a new content playback request occurs while the communication device 101 and the communication device 102 are performing any one of mirroring, direct streaming, and content redirection, with reference to FIGS. 3 and 4. According to the present embodiment, if a communication device or user that has transmitted an instruction to play back content that is being played back transmits a new instruction to play back content during playback of the content, playback of the next content can be started without a user's instruction to stop the playback that is in progress. On the other hand, if the individual playback instructions are provided from different communication devices or different users, a notification is transmitted to the user via the communication device that has transmitted the instruction to play back content that is being played back, and accordingly the user is able to recognize the occurrence of an interrupt. In addition, the user of the communication device that has transmitted the playback request for content that is being played back is allowed to select whether or not to permit interrupt by content playback, which makes it possible to prevent switching of content unintended by the user who is performing playback of content.

When the communication device 102 is performing S402 and the following operations in FIG. 4 with the communication device 101, the communication device 102 is able to start S402 and the following operations with the communication device 104 in response to receipt of a device finding request from the communication device 104 different from the communication device 101. That is, the communication device 102 (sink device) is able to establish sessions with a plurality of source devices in parallel. Accordingly, the communication device 102 is able to receive content playback requests from a plurality of different communication devices.

In FIGS. 3 and 4, the communication device 101 and the communication device 102 transmit/receive a playback request after establishing a session, but the embodiment is not limited thereto. The communication device 101 may transmit a playback request as any one of the messages transmitted to the communication device 102 in S305 or S306. Specifically, the communication device 101 may transmit a parameter indicating a playback request of any one of content redirection, direct streaming, and mirroring by including the parameter in any one of the messages transmitted in S305 and S306. In this case, the communication device 101 and the communication device 102 skip S307 and S406, respectively. The communication device 102 starts the processing from S407 upon receiving a message including a parameter indicating a playback request. In the case of starting playback of content in response to a playback request from the communication device 101, the communication device 102 establishes a session with the communication device 101 and then starts playing back the content. On the other hand, in the case of not starting playback of content in response to a playback request from the communication device 101, the communication device 102 does not establish a session with the communication device 101. The communication device 101 may make a determination in S308 in accordance with whether or not a session with the communication device 102 has been established. The communication device 101 makes an affirmative determination if the session has been established, and makes a negative determination if the session has not been established. When performing S417 in FIG. 4, the communication device 102 may transmit a message that has not been transmitted at the time point of S417 among the messages transmitted in S404 to S405 by including "NG" or error in the message. For example, even if the communication device 102 receives an M4 message as a playback request, the communication device 102 may transmit an OK response to the M4 message, and then transmit any one of an M5 message, an M6 message, and an M7 message indicating "NG" in S417.

In FIGS. 3 and 4, the communication device 101 and the communication device 102 may start mirroring after establishing a session in S306 and S405, respectively. In this case, the communication device 101 starts transmitting content by mirroring after performing S306, and performs S307 while transmitting the content. The communication device 101 may switch whether or not to start mirroring after establishing the session on the basis of whether or not it is determined in S301 that mirroring is to be started. Similarly, the communication device 102 may receive content from the communication device 101 by mirroring after performing S405. At this time, the communication device 102 determines the playback status of the communication device 102, and may perform control to start playing back content by mirroring if it is determined that playback is not in progress and not to play back content by mirroring if it is determined that playback is in progress. Alternatively, the communication device 102 may start playing back content by mirroring after determining that a new playback request is a playback request of mirroring and determining to start playback of content based on the new playback request.

In FIG. 4, the communication device 102 performs S412 and the following operations if the communication device 102 makes a negative determination in S411. Alternatively, the communication device 102 may perform S414 if the communication device 102 makes a negative determination in S411. In this case, the communication device 102 performs S412 and the following operations if the communication device 102 makes a negative determination in S414 or after performing S416. The communication device 102 performs S418 and the following operations if the communication device 102 makes a negative determination in S413.

Figure 6:
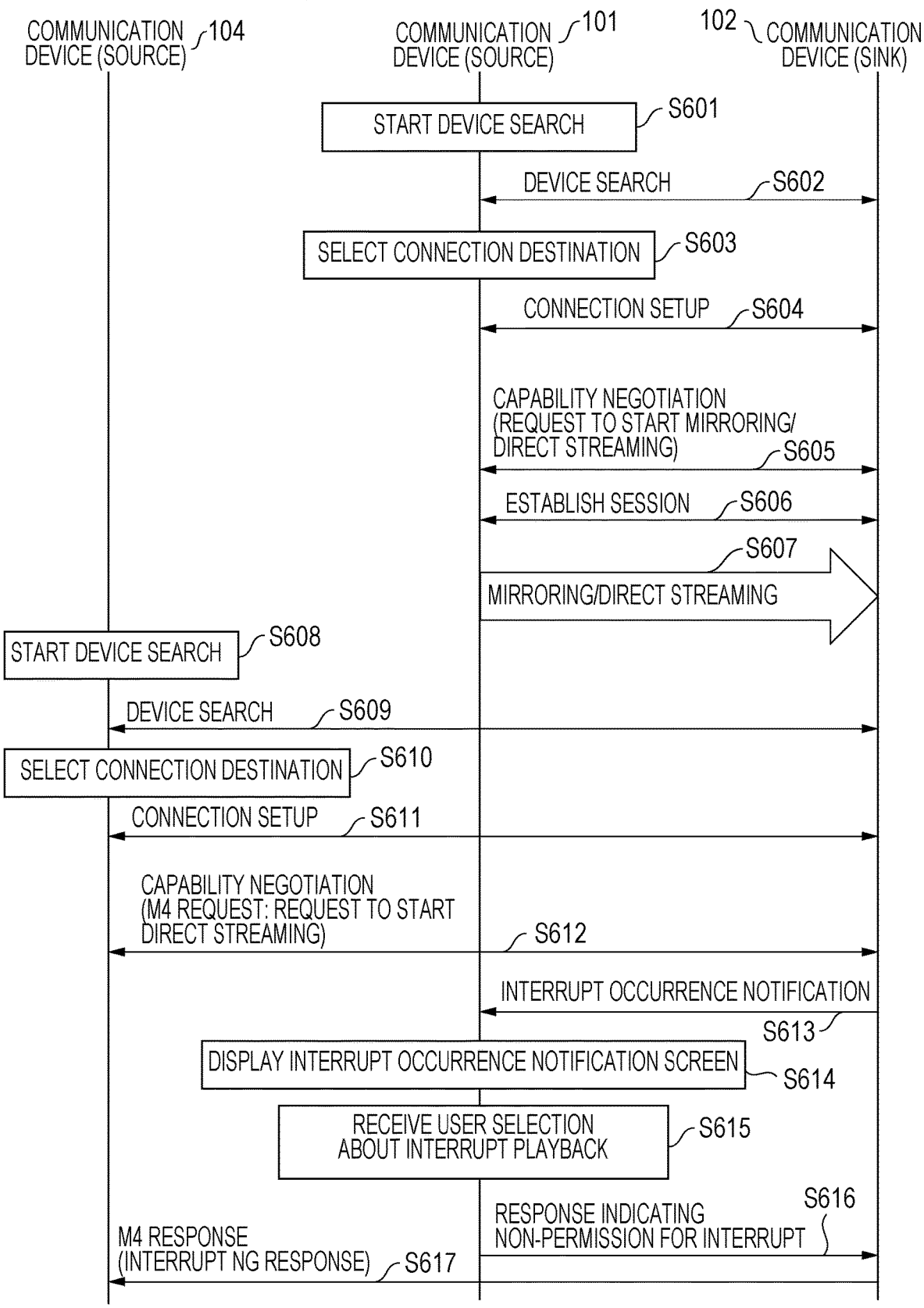
FIG. 6 is a sequence diagram illustrating processing performed when, while a first source device and a sink device are performing mirroring or direct streaming, an interrupt by direct streaming from a second source device to the sink device is not permitted.

FIG. 6 illustrates a sequence in which the communication device 104 transmits a playback request of direct streaming while the communication device 101 and the communication device 102 are performing mirroring or direct streaming, but the interrupt is not permitted. The communication device 101 and the communication device 104 operate in accordance with the flowchart in FIG. 3, and the communication device 102 operates in accordance with the flowchart in FIG. 4.

If an affirmative determination is made in S301 in FIG. 3, the communication device 101 starts device search (S601). The communication device 101 and the communication device 102 perform S302 in FIG. 3 and S402 in FIG. 4, respectively, thereby performing a device search (S602). The communication device 101 performs S303 in FIG. 3, thereby selecting a connection destination (S603). In this operation, the communication device 101 selects the communication device 102 as a connection destination. The communication device 101 and the communication device 102 perform S304 in FIG. 3 and S403 in FIG. 4, respectively, thereby performing connection setup (S604).

Subsequently, the communication device 101 and the communication device 102 perform S305 in FIG. 3 and S404 in FIG. 4, respectively, thereby performing capability negotiation (S605). In this case, it is assumed that the RTSP M4 request transmitted from the communication device 101 to the communication device 102 to perform capability negotiation includes a parameter indicating a playback request of direct streaming The parameter included in the RTSP M4 request is, for example, wfd2-direct-streaming-mode that is set to active. In this case, the RTSP M4 request transmitted in this operation serves as a playback request of direct streaming. The communication device 102 performs S407 and S408 in FIG. 4, thereby determining whether or not the playback status of the communication device 102 is "in progress". Since the communication device 102 is not performing playback, the communication device 102 makes a negative determination in S408, and then performs S421. Here, the communication device 102 transmits an RTSP M4 response indicating "OK" as a response to the received RTSP M4 request.

The communication device 101 and the communication device 102 perform S306 in FIG. 3 and S405 in FIG. 4, respectively, thereby establishing a session (S606). The communication device 101 and the communication device 102 start direct streaming (S607).

In the case of starting mirroring in S607, the communication device 101 and the communication device 102 may perform different processing in S605 to S607. The communication device 101 and the communication device 102 perform S305 in FIG. 3 and S404 in FIG. 4, respectively, thereby performing capability negotiation (S605). In this case, the communication device 101 transmits to the communication device 102 an RTSP M4 request that does not include a parameter indicating a playback request of direct streaming or content redirection. The communication device 102 transmits an RTSP M4 response indicating "OK" to the RTSP M4 request, thereby completing capability negotiation with the communication device 101. The communication device 101 and the communication device 102 perform S306 in FIG. 3 and S405 in FIG. 4, respectively, thereby establishing a session (S606). After establishing the session with the communication device 101, the communication device 102 determines whether or not a playback request of content redirection or direct streaming is received from the communication device 101 by the time a predetermined time elapses. If the communication device 102 does not receive the playback request by the time the predetermined time elapses, the communication device 102 determines that the RTSP M4 request received in S605 is a playback request of mirroring, and then performs S407 in FIG. 4. Since the playback status of the communication device 102 is not "in progress", the communication device 102 starts mirroring with the communication device 101 (S607).

Subsequently, the communication device 104 starts device search (S608) if an affirmative determination is made in S301 in FIG. 3. The communication device 104 and the communication device 102 perform S302 in FIG. 3 and S402 in FIG. 4, respectively, thereby performing a device search (S609). The communication device 104 performs S303 in FIG. 3, thereby selecting a connection destination (S610). In this operation, the communication device 104 selects the communication device 102 as a connection destination. The communication device 104 and the communication device 102 perform S304 in FIG. 3 and S403 in FIG. 4, respectively, thereby performing connection setup (S611).

Subsequently, the communication device 104 and the communication device 102 perform S305 in FIG. 3 and S404 in FIG. 4, respectively, thereby performing capability negotiation (S612). In this case, it is assumed that an RTSP M4 request transmitted from the communication device 104 to the communication device 102 to perform capability negotiation includes a parameter indicating a playback request of direct streaming. The parameter included in the RTSP M4 message is, for example, wfd2-direct-streaming-mode that is set to active. In this case, the RTSP M4 request transmitted in this operation serves as a playback request of direct streaming. The communication device 102 performs S407 and S408 in FIG. 4 to determine whether or not the playback status of the communication device 102 is "in progress."

The communication device 102 has already started direct streaming or mirroring with the communication device 101 and is playing back content, and thus makes an affirmative determination in S408. In this sequence, it is assumed that the communication device 102 is unable to receive user identification information from the start request received in at least one of S605 and S612. In this case, the communication device 102 makes a negative determination in S409 in FIG. 4 and makes a determination in S410.

The playback requests received by the communication device 102 in S605 and S612 are from different source communication devices, and thus the communication device 102 makes a negative determination in S410. The communication device 102 performs S412 in FIG. 4, thereby notifying the communication device 101 that an interrupt has occurred (S613).

Upon receiving the interrupt occurrence notification, the communication device 101 performs S312 in FIG. 3, thereby displaying an interrupt occurrence notification screen to notify the user that an interrupt has occurred (S614). Subsequently, the communication device 101 receives a user selection of whether or not to permit interrupt playback (S615). In this flow, it is assumed that the user does not permit interrupt playback.

Upon receiving the user selection about interrupt playback, the communication device 101 makes a determination in S313 in FIG. 3. In this flow, the user does not permit interrupt playback, and thus the communication device 101 performs S316 in FIG. 3, thereby transmitting a response indicating non-permission for the interrupt to the communication device 102 (S616)

Upon receiving the response to the interrupt occurrence notification from the communication device 101. the communication device 102 makes a determination in S413 in FIG. 4. In this flow, a response indicating non-permission for the interrupt is received, and thus the communication device 102 makes a negative determination in S413 and performs S417, thereby transmitting an RTSP M4 response indicating "NG" to the communication device 104 (S617). The communication device 101 and the communication device 102 continue the mirroring or direct streaming started in S607.

Figure 7:
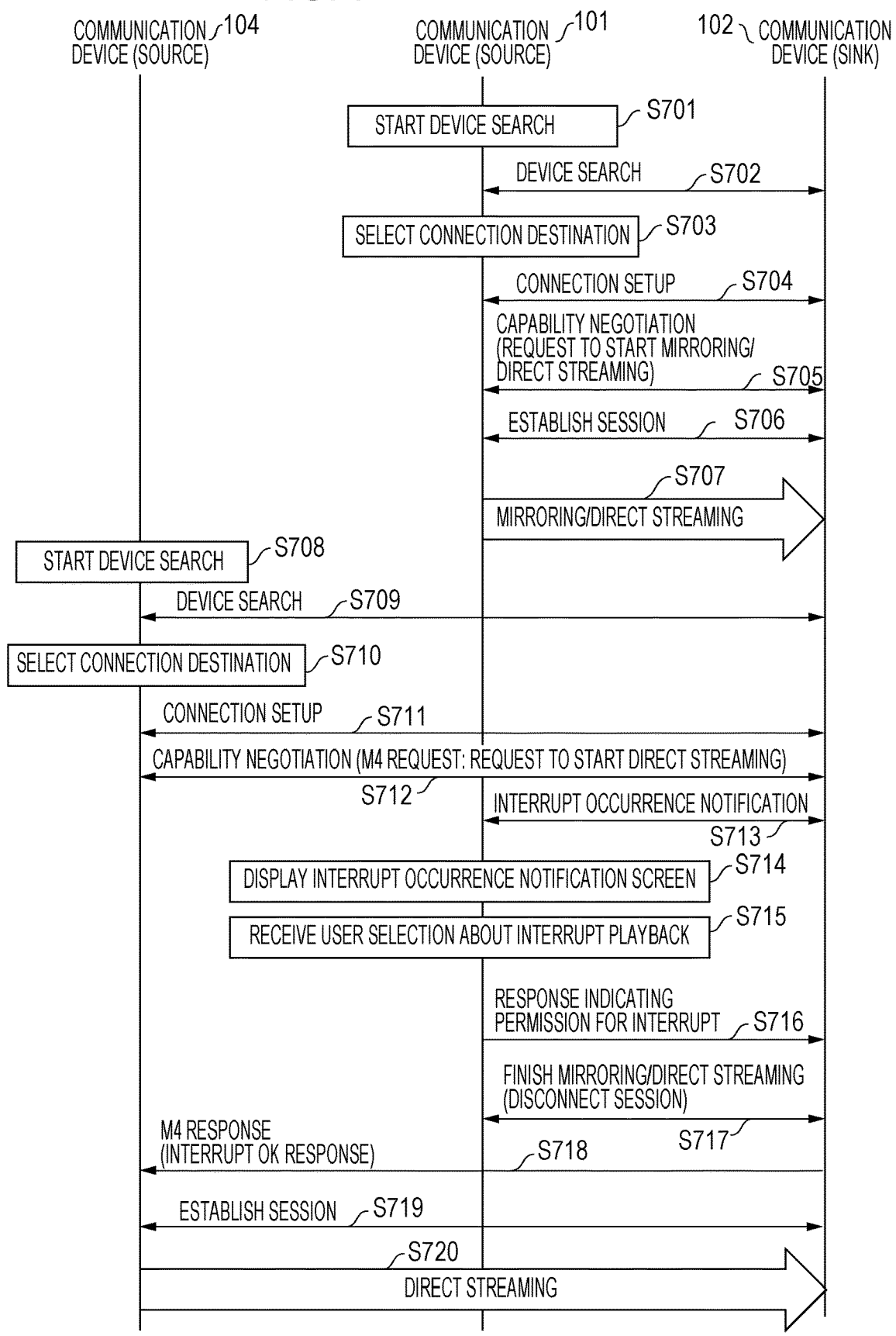
FIG. 7 is a sequence diagram illustrating processing performed when, while the first source device and the sink device are performing mirroring or direct streaming, an interrupt by direct streaming from the second source device to the sink device is permitted.

FIG. 7 illustrates a sequence in which the communication device 104 transmits a playback request of direct streaming while the communication device 101 and the communication device 102 are performing mirroring or direct streaming, and the interrupt is permitted. The communication device 101 and the communication device 104 operate in accordance with the flowchart in FIG. 3, and the communication device 102 operates in accordance with the flowchart in FIG. 4.

S701 to S714 are performed similarly to S601 to S614 in FIG. 6.

The communication device 101 receives a user selection of whether or not to permit interrupt playback (S715). In this flowchart, it is assumed that the user permits interrupt playback.

Upon receiving the user selection about interrupt playback, the communication device 101 makes a determination in S313 in FIG. 3. In this flow, the user permits interrupt playback, and thus the communication device 101 performs S314 in FIG. 3, thereby transmitting a response indicating permission for the interrupt to the communication device 102 (S716).

Upon receiving the response to the interrupt occurrence notification from the communication device 101, the communication device 102 makes a determination in S413 in FIG. 4. In this flow, the communication device 102 receives a response indicating permission for the interrupt, and thus the communication device 102 makes an affirmative determination in S413. In this case, the communication device 101 and the communication device 102 perform S315 in FIG. 3 and S420 in FIG. 4, respectively, thereby finishing the mirroring or direct streaming started in S707 (S717). At this time, the communication device 101 and the communication device 102 may transmit/receive an RTSP M8 message (RTSP TEARDOWN) to disconnect the session established in S706.

Upon finishing the mirroring or direct streaming with the communication device 101, the communication device 102 performs S421 in FIG. 4, thereby transmitting an RTSP M4 response indicating "OK" to the communication device 104 (S718). The communication device 104 and the communication device 102 perform S306 in FIG. 3 and S405 in FIG. 4, respectively, thereby establishing a session (S719). Subsequently, the communication device 104 performs S309 in FIG. 3 and the communication device 102 performs S422 in FIG. 4, thereby starting direct streaming (S720). Accordingly, the communication device 102 starts playing back content based on the new playback request.

Figure 8:
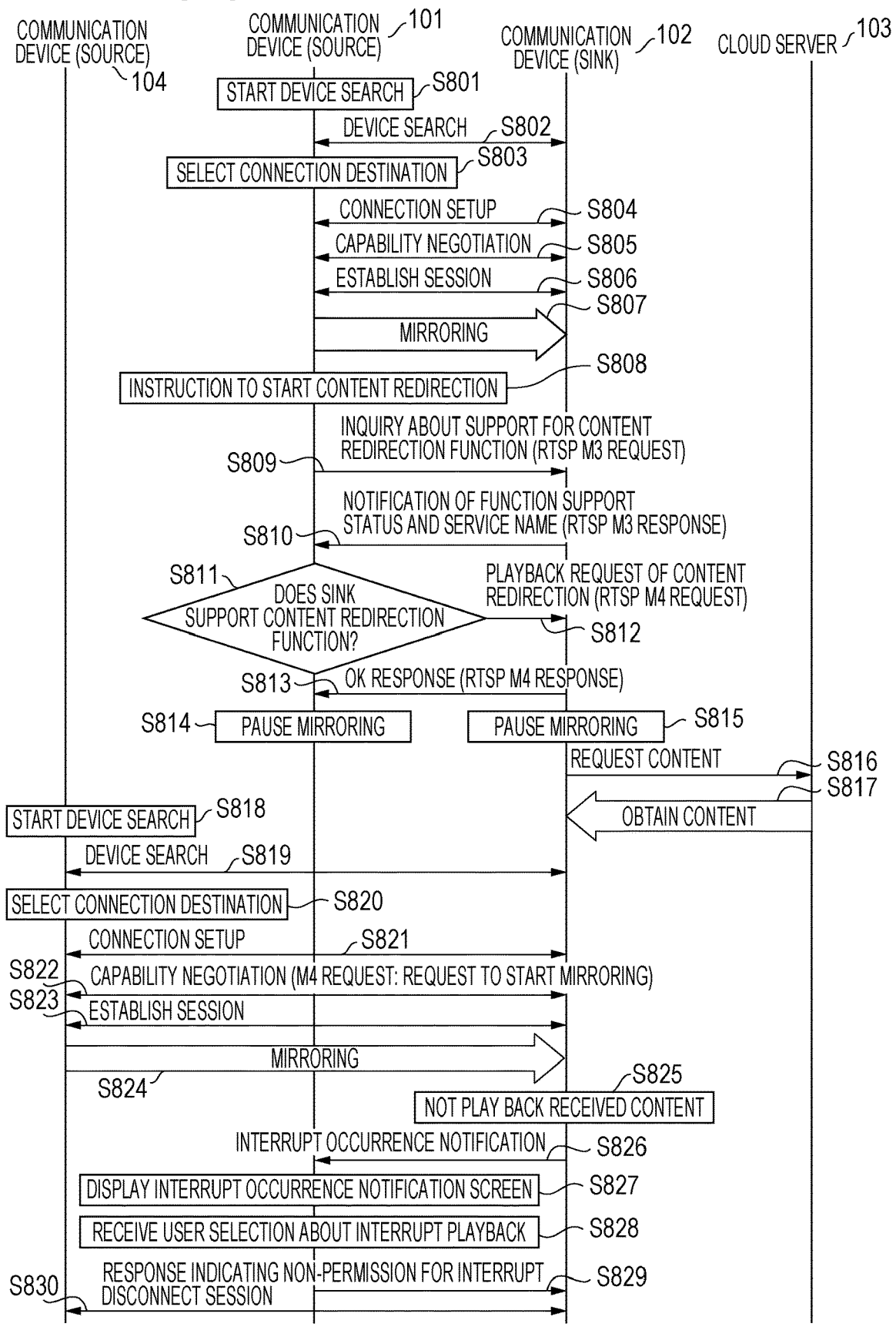
FIG. 8 is a sequence diagram illustrating processing performed when, while the first source device and the sink device are performing content redirection, an interrupt by mirroring from the second source device to the sink device is not permitted.

FIG. 8 illustrates a sequence in which the communication device 104 transmits a playback request of mirroring while the communication device 101 and the communication device 102 are performing content redirection, but the interrupt is not permitted. The communication device 101 and the communication device 104 operate in accordance with the flowchart in FIG. 3, and the communication device 102 operates in accordance with the flowchart in FIG. 4.

S801 to S804 are performed similarly to S601 to S604 in FIG. 6.

The communication device 101 and the communication device 102 perform S305 in FIG. 3 and S404 in FIG. 4, respectively, thereby performing capability negotiation (S805). At this time, the communication device 101 transmits an M4 request that does not include a parameter indicating a request to start content redirection.

The communication device 101 and the communication device 102 perform S306 in FIG. 3 and S405 in FIG. 4, respectively, thereby establishing a session (S806). Subsequently, the communication device 101 and the communication device 102 start mirroring (S807).

The communication device 101 receives an instruction to start content redirection while performing mirroring (S808). If an instruction to start content redirection is received in S801, the communication device 101 may skip S808.

Upon receiving the instruction to start content redirection, the communication device 101 inquires of the communication device 102 whether or not the communication device 102 supports the content redirection function, by using an RTSP M3 request (S809).

In response to the received inquiry about the content redirection function, the communication device 102 notifies the communication device 101 of the support status of the content redirection function by using an RTSP M3 response (S810). Specifically, the communication device 102 notifies the communication device 101 whether or not the communication device 102 supports the content redirection function. The communication device 102 may notify the communication device 101 of information about a service that is available when the communication device 102 plays back content by using the content redirection function, in addition to or instead of the information indicating that the communication device 102 supports the content redirection function. Specifically, the communication device 102 may notify the communication device 101 of information such as a service name identifying the service.

The communication device 101 determines, on the basis of the response received from the communication device 102 in S810, whether or not the communication device 102 supports the content redirection function (S811). If the communication device 102 does not support the content redirection function, the communication device 101 may continue the mirroring with the communication device 102 or may disconnect the session with the communication device 102.

If the communication device 102 supports the content redirection function, the communication device 101 transmits a playback request of content redirection to the communication device 102 by using an RTSP M4 request (S812). In this operation, the RTSP M4 request transmitted by the communication device 101 includes a parameter indicating a playback request of content redirection, and the parameter includes content-related information.

Upon receiving the playback request of content redirection from the communication device 101, the communication device 102 performs S407 and the following operations in FIG. 4. The playback status of the communication device 102 is "in progress", but the source of the playback request of mirroring that is currently in progress and the source of the playback request of content redirection are communication device 101, and thus the communication device 102 performs S421 in FIG. 4. Specifically, the communication device 102 transmits an RTSP M4 response indicating "OK" to the communication device 101 as a response to the RTSP M4 request (S813).

The communication device 101 and the communication device 102 pause the mirroring (S814 and S815). Subsequently, the communication device 102 requests content to the cloud server 103 on the basis of the content-related information received in S812 (S816), and obtains the content from the cloud server 103 (S817).

S818 to S821 are similar to S608 to S611 in FIG. 6.

The communication device 104 and the communication device 102 perform S305 in FIG. 3 and S404 in FIG. 4, respectively, thereby performing capability negotiation (S822). In this case, the communication device 104 transmits an RTSP M4 request that does not include a parameter indicating a playback request of direct streaming or content redirection to the communication device 102. The communication device 102 transmits an RTSP M4 response indicating "OK" to the RTSP M4 request, thereby completing the capability negotiation with the communication device 104. The communication device 104 and the communication device 102 perform S306 in FIG. 3 and S405 in FIG. 4, respectively, thereby establishing a session (S823).

After establishing the session, the communication device 104 and the communication device 102 start mirroring (S824). However, the communication device 102 is performing content redirection with the communication device 101 and is playing back content, and thus does not play back content received through mirroring (S825).

The communication device 102 determines whether or not to receive a playback request of content redirection or direct streaming from the communication device 104 by the time a predetermined time elapses from the establishment of the session with the communication device 104. If the communication device 102 does not receive the playback request by the time the predetermined time elapses, the communication device 102 determines that the RTSP M4 request received in S822 is a playback request of mirroring, and then performs S407 in FIG. 4.

The communication device 102 is playing back content, and the source communication device of the playback request received in S812 is different from the source communication device of the playback request received in S822, and thus the communication device 102 performs S412 in FIG. 4. Specifically, the communication device 102 notifies the communication device 101 that an interrupt has occurred (S826).

Upon receiving the interrupt occurrence notification, the communication device 101 performs S312 in FIG. 3, thereby displaying an interrupt occurrence notification screen to notify the user that an interrupt has occurred (S827). Subsequently, the communication device 101 receives a user selection of whether or not to permit interrupt playback (S828). In this flow, it is assumed that the user does not permit interrupt playback.

Upon receiving the user selection about interrupt playback, the communication device 101 makes a determination in S313 in FIG. 3. In this flow, the user does not permit interrupt playback, and thus the communication device 101 performs S316 in FIG. 3, thereby transmitting a response indicating non-permission for the interrupt to the communication device 102 (S829).

Upon receiving the response to the interrupt occurrence notification from the communication device 101, the communication device 102 makes a determination in S413 in FIG. 4. In this flow, the communication device 102 receives the response indicating non-permission for the interrupt, and thus the communication device 102 makes a negative determination in S413 and then performs S417. In this flow, the communication device 102 disconnects the session with the communication device 104 instead of transmitting an NG response (S830). The communication device 101 and the communication device 102 continue the content redirection started in S817.

The communication device 102 may start S407 and the following operations in FIG. 4 in response to receipt of the RTSP M4 request in S822. In this case, the communication device 101, the communication device 102, and the communication device 104 perform S612 to S617 in FIG. 6.

Figure 9:
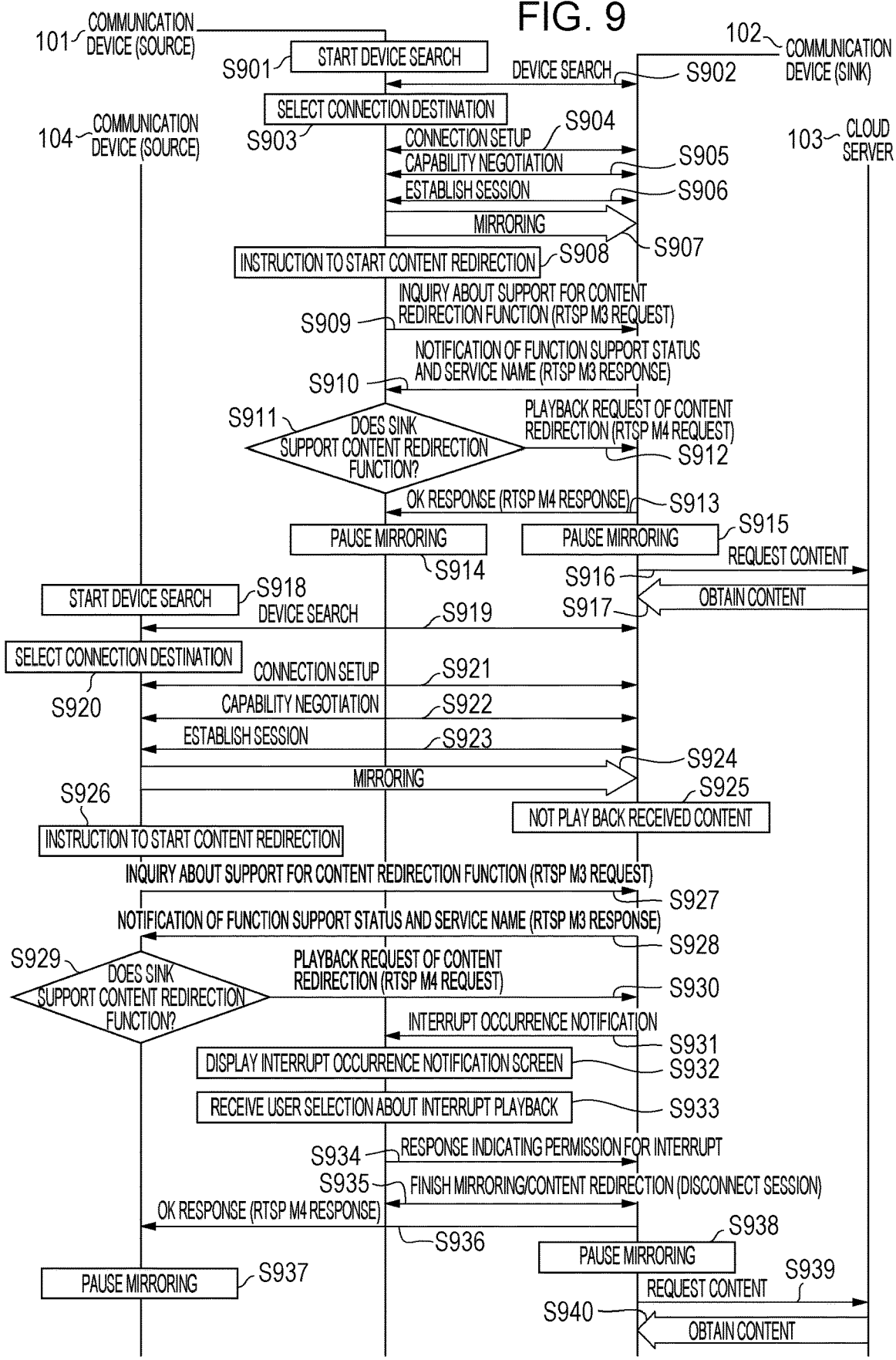
FIG. 9 is a sequence diagram illustrating processing performed when, while the first source device and the sink device are performing content redirection, an interrupt by content redirection from the second source device to the sink device is permitted.

FIG. 9 illustrates a sequence in which the communication device 104 transmits a playback request of content redirection while the communication device 101 and the communication device 102 are performing content redirection, and the interrupt is permitted. The communication device 101 and the communication device 104 operate in accordance with the flowchart in FIG. 3, and the communication device 102 operates in accordance with the flowchart in FIG. 4. In this flow, it is assumed that the user of the communication device 101 is different from the user of the communication device 104.

S901 to S925 are similar to S801 to S825 in FIG. 8.

The communication device 104 receives an instruction to start content redirection (S926). The communication device 104 inquires of the communication device 102 whether or not the communication device 102 supports the content redirection function by using an RTSP M3 request (RTSP GET_PARAMETER) (S927).

In response to the received inquiry about the content redirection function, the communication device 102 notifies the communication device 104 of the support status of the content redirection function by using an RTSP M3 response (S928). Specifically, the communication device 102 notifies the communication device 104 whether or not the communication device 102 supports the content redirection function. The communication device 102 may notify the communication device 104 of information about a service that is available when the communication device 102 plays back content by using the content redirection function, in addition to or instead of the information indicating that the communication device 102 supports the content redirection function. Specifically, the communication device 102 may notify the communication device 104 of information such as a service name identifying the service.

The communication device 104 determines, on the basis of the response received from the communication device 102 in S928, whether or not the communication device 102 supports the content redirection function (S929). If the communication device 102 does not support the content redirection function, the communication device 104 may disconnect the session with the communication device 102.

If the communication device 102 supports the content redirection function, the communication device 104 transmits a playback request of content redirection to the communication device 102 by using an RTSP M4 request (S930). In this operation, the RTSP M4 request transmitted by the communication device 104 includes a parameter indicating a playback request of content redirection, and the parameter includes content-related information.

Upon receiving the playback request of content redirection from the communication device 104, the communication device 102 performs S407 and the following operations in FIG. 4. In this flow, the user of the communication device 101 is different from the user of the communication device 104, and thus the communication device 102 notifies the communication device 101 that an interrupt has occurred (S931).

Upon receiving the interrupt occurrence notification, the communication device 101 performs S312 in FIG. 3, thereby displaying an interrupt occurrence notification screen to notify the user that an interrupt has occurred (S932). Subsequently, the communication device 101 receives a user selection of whether or not to permit interrupt playback (S933). In this flow, it is assumed that the user permits interrupt playback.

Upon receiving the user selection about interrupt playback, the communication device 101 makes a determination in S313 in FIG. 3. In this flow, the user permits interrupt playback, and thus the communication device 101 performs S314 in FIG. 3, thereby transmitting a response indicating permission for the interrupt to the communication device 102 (S934).

Upon receiving the response to the interrupt occurrence notification from the communication device 101, the communication device 102 makes a determination in S413 in FIG. 4. In this flow, the communication device 102 receives the response indicating permission for the interrupt, and thus the communication device 102 makes an affirmative determination in S413. In this case, the communication device 101 and the communication device 102 perform S315 in FIG. 3 and S420 in FIG. 4, respectively, thereby finishing the mirroring and content redirection started in S907 (S935). At this time, the communication device 101 and the communication device 102 may transmit/receive an RTSP M8 message (RTSP TEARDOWN) to disconnect the session established in S906.

After finishing the mirroring and content redirection with the communication device 101, the communication device 102 performs S421 in FIG. 4, thereby transmitting an RTSP M4 response indicating "OK" to the communication device 104 (S936).

The communication device 104 and the communication device 102 pause the mirroring (S937 and S938), and the communication device 102 requests content to the cloud server 103 (S939). Upon obtaining the content from the cloud server 103 (S940), the communication device 102 starts playing back the obtained content. Accordingly, the communication device 102 starts playing back the content based on the new playback request.

In the present embodiment, if the communication device 102 receives a new playback request for content while playing back content, the communication device 102 obtains user identification information related to the playback request and identification information of the source device (S407 in FIG. 4). However, the embodiment is not limited thereto, and the communication device 102 does not necessarily obtain user identification information related to the playback request. In this case, the communication device 102 makes an affirmative determination in S408 in FIG. 4, skips S409, and then makes a determination in S410. The communication device 102 also skips S411. If the communication device that has transmitted the playback request for the content that is being played back is identical to the communication device that has transmitted the new playback request for content, the communication device 102 starts playing back the new content. On the other hand, if the communication device that has transmitted the playback request for the content that is being played back is different from the communication device that has transmitted the new playback request for content, the communication device 102 continues playing back the content that is being played back.

That is, the communication device 102 controls playback of content on the basis of whether or not the communication device that has transmitted the playback request for content that is being played back is identical to the communication device that has transmitted a new playback request for content.

In the Wi-Fi Miracast standard, a communication device uses a real-time transport protocol (RTP) when transmitting content by mirroring or direct streaming. The RTP is a protocol for transmitting/receiving multimedia data, such as image data, audio data, and moving image data, in real time through a network, and uses UDP or TCP as a lower-layer transport protocol. UDP stands for User Datagram Protocol, and TCP stands for Transmission Control Protocol.

When performing content redirection, the communication device is able to use RTSP, DLNA®, SIP, HLS, MPEG-DASH, RTMP, or the like as a protocol. Alternatively, the communication device may use another protocol or another scheme suitable for playback control of streaming. DLNA stands for Digital Living Network Alliance, and SIP stands for Session Initiation Protocol. HLS stands for HTTP Live Streaming, and MPEG-DASH stands for MPEG-Dynamic Adaptive Streaming over HTTP. RTMP stands for Real Time Messaging Protocol.

At least a part or whole of the flowchart illustrated in FIG. 3 or FIG. 4 performed by the communication device 101 or the communication device 102 may be implemented by hardware. In the implementation by hardware, for example, a dedicated circuit may be generated on an FPGA from a computer program for implementing each operation by using a predetermined compiler and may be used. FPGA stands for Field Programmable Gate Array. Alternatively, a gate array circuit may be formed similarly to the FPGA to achieve implementation by hardware. Alternatively, an application specific integrated circuit (ASIC) may be used for the implementation.

The individual operations of the flowchart illustrated in FIG. 3 or FIG. 4 may be performed by a plurality of CPUs or devices (not illustrated) in a dispersed manner. In the case of performing the operations by a plurality of devices in a dispersed manner, a source device operates as a source system, and a sink device operates as a sink system. The same applies to the sequence diagrams for the communication device 101, the communication device 102, the communication device 104, and the cloud server 103 illustrated in FIGS. 6 to 9.

For example, each of the communication device 101 and the communication device 104 may be a source system constituted by a playback device that plays back content and a processing device that performs processing, such as transmission of a radio signal. When performing mirroring processing, for example, the processing device may perform encoding, multiplexing, and data transmission processing on audio that is being played back by the playback device, in addition to or instead of a capture image of a screen displayed on the playback device. When each of the communication device 101 and the communication device 104 is a source system constituted by a plurality of devices, the device that performs each operation in FIG. 3 is not limited thereto.

Similarly, the communication device 102 may be a sink system constituted by a playback device that plays back content and a processing device that performs processing, such as transmission of a radio signal. When performing mirroring processing, for example, the playback device may perform playback of a capture image that has been received from the communication device 101 and that has been decoded. When audio is received instead of or in addition to the capture image, the playback device may perform playback of decoded audio. When the communication device 102 is a sink system constituted by a plurality of devices, the device that performs each operation in FIG. 4 is not limited thereto.

The embodiment has been described in detail above. Some embodiments may be a system, a device, a method, a program, a recording medium (storage medium), or the like. Specifically, an embodiment may be applied to a system constituted by a plurality of devices (for example, a host computer, an interface device, an image capturing device, a web application, and the like), or may be applied to an apparatus constituted by a single device.

An embodiment can be carried out through processing of supplying a program executing one or more functions of the above-described embodiment to a system or device via a network or storage medium and reading and executing the program by one or more processors in a computer of the system or device. Also, an embodiment can be carried out by a circuit executing one or more functions (for example, an ASIC).

According to an embodiment, when a new request to play back content is given to a communication device that is playing back content, playback of content can be appropriately controlled on the basis of whether or not source devices or users that have transmitted the individual playback requests are identical to each other.

Other Embodiments

Some embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-143507, which was filed on Jul. 31, 2018 and which is hereby incorporated by reference herein in its entirety.

What is claimed is:

1. A communication device comprising:
a first receiving unit configured to receive a playback request for content;
a playback unit configured to play back the content based on the playback request received by the first receiving unit;
an obtaining unit configured to obtain device identification information for identifying a source device that has transmitted the playback request received by the first receiving unit; and
a control unit configured to perform, in a case where the first receiving unit receives a playback request for second content while the playback unit is playing back first content, control to start playing back the second content, based on a fact that a source device identified by first device identification information is identical to a source device identified by second device identification information, the first device identification information identifying a source device that has transmitted a playback request for the first content, the second device identification information identifying a source device that has transmitted the playback request for the second content, and control to continue playing back the first content, based on a fact that the source device identified by the first device identification information is different from the source device identified by the second device identification information.

2. The communication device according to claim 1, further comprising a first notifying unit configured to notify, based on a fact that the source device identified by the first device identification information is different from the source device identified by the second device identification information, the source device that has transmitted the playback request for the first content that an interrupt has occurred.

3. The communication device according to claim 2, further comprising a second receiving unit configured to receive a response to a notification made by the first notifying unit from the source device that has transmitted the playback request for the first content, wherein
the control unit performs control to start playing back the second content, based on a fact that the source device identified by the first device identification information is different from the source device identified by the second device identification information and that the second receiving unit has received a response indicating permission for the interrupt, and control to continue playing back the first content, based on a fact that the source device identified by the first device identification information is different from the source device identified by the second device identification information and that the second receiving unit has received a response indicating non-permission for the interrupt.

4. The communication device according to claim 1, wherein the device identification information obtained by the obtaining unit is a media access control (MAC) address of the source device that has transmitted the playback request received by the first receiving unit.

5. The communication device according to claim 1, wherein the device identification information obtained by the obtaining unit is a universally unique identifier (UUID) of the source device that has transmitted the playback request received by the first receiving unit.

6. The communication device according to claim 1, wherein the device identification information obtained by the obtaining unit is an Internet protocol (IP) address of the source device that has transmitted the playback request received by the first receiving unit.

7. The communication device according to claim 1, wherein in a case where the playback request received by the first receiving unit is a mirroring playback request,
the playback unit plays back, in synchronization with the source device that has transmitted the mirroring playback request, content including at least one of image data which is based on a screen displayed on the source device that has transmitted the mirroring playback request and which has been received from the source device that has transmitted the mirroring playback request, and audio data which is based on audio that is being played back.

8. The communication device according to claim 1, wherein in a case where the playback request received by the first receiving unit is a direct streaming playback request,
the playback unit plays back content which is held by the source device that has transmitted the direct streaming playback request and which has been received from the source device that has transmitted the direct streaming playback request.

9. The communication device according to claim 1, wherein in a case where the playback request received by the first receiving unit is a content redirection playback request,
the playback unit plays back content received from an external device different from the source device that has transmitted the content redirection playback request, based on related information about the content included in the content redirection playback request.

10. The communication device according to claim 9, wherein the related information is a uniform resource identifier (URI) indicating a storage region of the content in the external device.

11. The communication device according to claim 1, further comprising a second notifying unit configured to notify, based on a fact that the control unit has performed control to continue playing back the first content, the source device that has transmitted the playback request for the second content of non-permission for playback of the second content.

12. The communication device according to claim 1, further comprising a third notifying unit configured to notify, based on a fact that the control unit has performed control to continue playing back the first content, the source device that has transmitted the playback request for the second content of permission for playback of the second content.

13. The communication device according to claim 1, wherein the first receiving unit receives the playback request for the content in accordance with a scheme conforming to a Wi-Fi Miracast standard.

14. A communication device comprising:
a first receiving unit configured to receive a playback request for content;
a playback unit configured to play back the content based on the playback request received by the first receiving unit;
an obtaining unit configured to obtain user identification information for identifying a user related to the playback request received by the first receiving unit; and
a control unit configured to perform, in a case where the first receiving unit receives a playback request for second content while the playback unit is playing back first content, control to start playing back the second content, based on a fact that a user identified by first user identification information is identical to a user identified by second user identification information, the first user identification information identifying a user related to a playback request for the first content, the second user identification information identifying a user related to the playback request for the second content, and control to continue playing back the first content, based on a fact that the user identified by the first user identification information is different from the user identified by the second user identification information.

15. The communication device according to claim 14, further comprising a first notifying unit configured to notify, based on a fact that the user identified by the first user identification information is different from the user identified by the second user identification information, a source device that has transmitted the playback request for the first content that an interrupt has occurred.

16. The communication device according to claim 15, further comprising a second receiving unit configured to receive a response to a notification made by the first notifying unit from the source device that has transmitted the playback request for the first content, wherein
the control unit performs control to start playing back the second content, based on a fact that the user identified by the first user identification information is different from the user identified by the second user identification information and that the second receiving unit has received a response indicating permission for the interrupt, and control to continue playing back the first content, based on a fact that the user identified by the first user identification information is different from the user identified by the second user identification information and that the second receiving unit has received a response indicating non-permission for the interrupt.

17. The communication device according to claim 14, wherein in a case where the playback request received by the first receiving unit is a mirroring playback request,
the playback unit plays back, in synchronization with a source device that has transmitted the mirroring playback request, content including at least one of image data which is based on a screen displayed on the source device that has transmitted the mirroring playback request and which has been received from the source device that has transmitted the mirroring playback request, and audio data which is based on audio that is being played back.

18. The communication device according to claim 14, wherein in a case where the playback request received by the first receiving unit is a direct streaming playback request,
the playback unit plays back content which is held by a source device that has transmitted the direct streaming playback request and which has been received from the source device that has transmitted the direct streaming playback request.

19. The communication device according to claim 14, wherein in a case where the playback request received by the first receiving unit is a content redirection playback request,
the playback unit plays back content received from an external device different from a source device that has transmitted the content redirection playback request, based on related information about the content included in the content redirection playback request.

20. The communication device according to claim 19, wherein the related information is a uniform resource identifier (URI) indicating a storage region of the content in the external device.

21. The communication device according to claim 14, further comprising a second notifying unit configured to notify, based on a fact that the control unit has performed control to continue playing back the first content, a source device that has transmitted the playback request for the second content of non-permission for playback of the second content.

22. The communication device according to claim 14, further comprising a third notifying unit configured to notify, based on a fact that the control unit has performed control to continue playing back the first content, a source device that has transmitted the playback request for the second content of permission for playback of the second content.

23. The communication device according to claim 14, wherein the first receiving unit receives the playback request for the content in accordance with a scheme conforming to a Wi-Fi Miracast standard.

24. A control method comprising:
receiving a playback request for first content;
obtaining first device identification information for identifying a source device that has transmitted the playback request for the first content;
receiving a playback request for second content while a communication device is playing back the first content in response to the playback request for the first content;
obtaining second device identification information for identifying a source device that has transmitted the playback request for the second content; and
performing control to start playing back the second content, based on a fact that the source device identified by the first device identification information is identical to the source device identified by the second device identification information, and control to continue playing back the first content, based on a fact that the source device identified by the first device identification information is different from the source device identified by the second device identification information.

25. A control method comprising:
receiving a playback request for first content;
obtaining first user identification information for identifying a user related to the playback request for the first content;
receiving a playback request for second content while a communication device is playing back the first content in response to the playback request for the first content;
obtaining second user identification information for identifying a user related to the playback request for the second content; and
performing control to start playing back the second content, based on a fact that the user identified by the first user identification information is identical to the user identified by the second user identification information, and control to continue playing back the first content, based on a fact that the user identified by the first user identification information is different from the user identified by the second user identification information.

26. A non-transitory computer-readable storage medium storing a computer program for causing a computer to execute a control method of a communication device, comprising:
receiving a playback request for first content;

obtaining first device identification information for identifying a source device that has transmitted the playback request for the first content;

receiving a playback request for second content while the communication device is playing back the first content in response to the playback request for the first content;

obtaining second device identification information for identifying a source device that has transmitted the playback request for the second content; and performing control to start playing back the second content, based on a fact that the source device identified by the first device identification information is identical to the source device identified by the second device identification information, and control to continue playing back the first content, based on a fact that the source device identified by the first device identification information is different from the source device identified by the second device identification information.

27. A non-transitory computer-readable storage medium storing a computer program for causing a computer to execute a control method of a communication device, comprising:

receiving a playback request for first content;

obtaining first user identification information for identifying a user related to the playback request for the first content;

receiving a playback request for second content while the communication device is playing back the first content in response to the playback request for the first content;

obtaining second user identification information for identifying a user related to the playback request for the second content; and performing control to start playing back the second content, based on a fact that the user identified by the first user identification information is identical to the user identified by the second user identification information, and control to continue playing back the first content, based on a fact that the user identified by the first user identification information is different from the user identified by the second user identification information.

* * * * *